(12) United States Patent
Abdulkader et al.

(10) Patent No.: US 7,369,702 B2
(45) Date of Patent: May 6, 2008

(54) TEMPLATE-BASED CURSIVE HANDWRITING RECOGNITION

(75) Inventors: Ahmad A. Abdulkader, Sammamish, WA (US); Brian Leung, Cambridge, MA (US); Henry Allan Rowley, New Castle, WA (US); Qi Zhang, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 777 days.

(21) Appl. No.: 10/702,663

(22) Filed: Nov. 7, 2003

(65) Prior Publication Data

US 2005/0100217 A1 May 12, 2005

(51) Int. Cl.
*G06K 9/00* (2006.01)
*G06K 9/62* (2006.01)
(52) U.S. Cl. .................. 382/187; 382/161; 382/224
(58) Field of Classification Search ............... 382/155, 382/156, 161, 186, 187, 224
See application file for complete search history.

(56) References Cited

U.S. PATENT DOCUMENTS

| | | | |
|---|---|---|---|
| 5,426,711 A * | 6/1995 | Kitamura | 382/187 |
| 5,521,985 A | 5/1996 | Camp, Jr. et al. | |
| 5,729,629 A | 3/1998 | Dai | |
| 6,052,481 A * | 4/2000 | Grajski et al. | 382/187 |
| 6,094,506 A | 7/2000 | Hullender | |
| 6,393,395 B1 | 5/2002 | Guha et al. | |
| 6,681,044 B1 * | 1/2004 | Ma et al. | 382/185 |
| 2002/0097910 A1 | 7/2002 | Guha | |

OTHER PUBLICATIONS

L. Vuurpijl and L. Schomaker. Coarse writing-style clustering based on simple stroke-related features. In "Progress in Handwriting Recognition". pp. 37-44, Colchester, Sep. 1996.*
Claus Bahlmann et al., "On-line Handwriting Recognition with Support Vector Machines—A Kernel Approach," Proceedings of 8th Int'l Workshop on Frontiers in Handwriting Recognition, (2002) pp. 49-54.
J.T. Chu, "Optimal Decision Functions for Computer Character Recognition," J. Assoc. for Computing Machinery, vol. 12, No. 2 (Apr. 1965) pp. 213-236.
M.D. Garris et al., "Analysis of a Biologically Motivated Neural Network for Character Recognition," ACM (May 1991) pp. 160-175.
Arnold K. Griffith, "Handprint Recognition on the GRAFIX I: A Commercial Application of Heuristic Programming," Proceedings of the 1974 Annual Conference (Jan. 1974) pp. 368-372.

(Continued)

*Primary Examiner*—Colin LaRose
(74) *Attorney, Agent, or Firm*—Birch, Stewart, Kolasch & Birch, LLP

(57) ABSTRACT

Input handwritten characters are classified as print or cursive based upon numerical feature values calculated from the shape of an input character. The feature values are applied to inputs of an artificial neural network which outputs a probability of the input character being print or cursive. If a character is classified as print, it is analyzed by a print character recognizer. If a character is classified as cursive, it is analyzed using a cursive character recognizer. The cursive character recognizer compares the input character to multiple prototype characters using a Dynamic Time Warping (DTW) algorithm.

27 Claims, 23 Drawing Sheets

OTHER PUBLICATIONS

Andre Meyer, "Pen Computing: A Technology Overview and a Vision," SIGCHI Bulletin, vol. 27, No. 3. (Jul. 1995) pp. 46-90.

James A. Pittman, "Recognizing Handwritten Text," ACM (1991) pp. 271-275.

Henry A. Rowley et al., "The Effect of Large Training Set Sizes on Online Japanese Kanji and English Cursive Recognizers," Proceedings of the 8th IWFHR, pp. 36-40, Niagara-on-the-Lake, Ontario, Canada.

Patrice Scattolin, "Recognition of Handwritten Numerals Using Elastic Matching," Thesis in Partial Fulfillment of Requirements for Master of Computer Science Concordia University, Montreal, Quebec, Canada (Nov. 1995).

Sargur N. Srihari, "Document Image Understanding," IEEE Proceedings of 1986 Fall Joint Computer Conference, Jul. 1986, pp. 87-96.

C.C. Tappert, "Cursive Script Recognition by Elastic Matching," IBM J. Res. Develop, vol. 26, No. 6 (Nov. 1982) pp. 765-771.

Naonori Ueda et al., "Automatic Shape Model Acquisition Using Multiscale Segment Matching," IEEE (May 1990) pp. 897-902.

Naonori Ueda et al., "Learning Visual Models from Shape Contours Using Multiscale Convex/Concave Structure Matching," IEEE (1993) pp. 337-352.

P. Patrick van der Smagt, "A comparative study of neural network algorithms applied to optical character recognition," ACM Proceedings of the Third International Conference on Industrial and Engineering Applications of Artificial Intelligence and Expert Systems, (Jun. 1990) vol. 2, pp. 1037-1044.

Larry S. Yaeger et al., "Combining Neural Networks and Context-Driven Search for On-Line, Printed Handwriting Recognition in the Newton," AI Magazine 19(1):73-90 (1998).

* cited by examiner

| feature | description | (FIG. 7) | (FIG. 8) | feature | description | (FIG. 7) | (FIG. 8) |
|---|---|---|---|---|---|---|---|
| 1 | no. of strokes | 8 | 5 | 34 | | 53466480 | 53466480 |
| 2 | 1/(1-strokes) | .875 | .8 | 35 | | 53466482 | 53466482 |
| 3 | Max-x Chebyshev | 28546 | 30529 | 36 | | 53466484 | 53466484 |
| 4 | | 37548 | 34020 | 37 | | 53466486 | 53466486 |
| 5 | | 27046 | 31106 | 38 | | 53466488 | 53466488 |
| 6 | | 29252 | 24857 | 39 | | 53466490 | 53466490 |
| 7 | | 20171 | 25192 | 40 | | 53466492 | 53466492 |
| 8 | | 32859 | 30411 | 41 | | 53466494 | 53466494 |
| 9 | | 29125 | 29950 | 42 | y-coord. Chebyshev | 53466478 | 53466478 |
| 10 | | 30589 | 30670 | 43 | | 53466480 | 53466480 |
| 11 | | 24755 | 27267 | 44 | | 53466482 | 53466482 |
| 12 | | 34370 | 28849 | 45 | | 53466484 | 53466484 |
| 13 | Max-y Chebyshev | 15077 | 19039 | 46 | | 53466486 | 53466486 |
| 14 | | 32853 | 32562 | 47 | | 53466488 | 53466488 |
| 15 | | 9948 | 5567 | 48 | | 53466490 | 53466490 |
| 16 | | 32829 | 32337 | 49 | | 53466492 | 53466492 |
| 17 | | 47322 | 44619 | 50 | | 53466494 | 53466494 |
| 18 | | 32376 | 32097 | 51 | z-coord. Chebyshev | 53466480 | 53466480 |
| 19 | | 28699 | 32800 | 52 | | 53466482 | 53466482 |
| 20 | | 33575 | 33151 | 53 | | 53466484 | 53466484 |
| 21 | | 28950 | 30585 | 54 | | 53466486 | 53466486 |
| 22 | | 32239 | 34625 | 55 | | 53466488 | 53466488 |
| 23 | Min-y Chebyshev | 44941 | 41636 | 56 | | 53466490 | 53466490 |
| 24 | | 34109 | 35090 | 57 | | 53466492 | 53466492 |
| 25 | | 58847 | 62093 | 58 | | 53466494 | 53466494 |
| 26 | | 30187 | 27425 | 59 | $distance_{top}$ | 0.164993 | 0.150986 |
| 27 | | 18715 | 25891 | 60 | $distance_{bottom}$ | 0.729996 | 0.743988 |
| 28 | | 35543 | 37043 | 61 | width | 0.357986 | 0.454987 |
| 29 | | 33459 | 26804 | 62 | width/ (width+height) | 0.329041 | 0.379471 |
| 30 | | 31477 | 31088 | 63 | mean y coord. | 0.529999 | 0.54599 |
| 31 | | 38556 | 34226 | 64 | total signed angles | 101 | -351 |
| 32 | | 32114 | 33510 | 65 | total abs. value of angles | 349 | 1123 |
| 33 | x-coord. Chebyshev | 53466478 | 53466478 | 66 | maximum angle | 52 | 174 |

| | ink of FIG. 7 | ink of FIG. 8 |
|---|---|---|
| output of 330(0) | 0.0756 | 0.9834 |
| output of 330(1) | 0.9243 | 0.0165 |

FIG. 24

TEMPLATE-BASED CURSIVE HANDWRITING RECOGNITION

FIELD OF THE INVENTION

The present invention relates to automatic recognition of characters written by a user in a cursive handwriting style. In particular, the present invention relates to distinguishing between handwritten characters that a user has created using printing and cursive styles, and applying different recognition procedures to each style of handwriting.

BACKGROUND OF THE INVENTION

Computers accept human user input in various ways. One of the most common input devices is the keyboard. Additional types of input mechanisms include mice and other pointing devices. Although useful for many purposes, keyboards and mice (as well as other pointing devices) sometimes lack flexibility. For example, many persons find it easier to write, take notes, etc. with a pen and paper instead of a keyboard. Mice and other types of pointing devices do not generally provide a true substitute for pen and paper. Traditional input device limitations are even more acute with regard to East Asian languages. As used herein, "East Asian" includes, but is not limited to, written languages such Japanese, Chinese and Korean. Written forms of these languages contain thousands of characters, and specialized keyboards for these languages can be cumbersome and require specialized training to properly use.

Electronic tablets or other types of electronic writing devices offer an attractive alternative to keyboards and mice. These devices typically include a stylus with which a user can write upon a display screen in a manner similar to using a pen and paper. A digitizer nested within the display converts movement of the stylus across the display into an "electronic ink" representation of the user's writing. The electronic ink is stored as coordinate values for a collection of points along the line(s) drawn by the user. Software may then be used to analyze the electronic ink to recognize characters, and then convert the electronic ink to Unicode, ASCII or other code values for what the user has written.

There are many handwriting recognition systems in use employing various algorithms to map handwritten data to characters. One such system is described in commonly-owned U.S. Pat. No. 5,729,629 ('629 patent), titled "Handwritten Symbol Recognizer," which patent is incorporated by reference herein. The described recognizer is useful for, e.g., recognition of East Asian language characters. The recognizer implements template matching for characters written in multiple strokes so as to map the features for all strokes of an input character to a Unicode or other value for the ink character. Each input stroke of a character is described by a five-dimensional feature vector representing the x and y coordinates of the stroke start and end points, together with a feature code corresponding to the overall shape of the stroke (e.g., vertical line, horizontal line, counterclockwise arc, etc.). The recognizer measures a Euclidian Vector Distance between each input stroke and a stroke of a stored reference character (or "prototype"). The database of prototypes is divided into multiple groupings (or "spaces") based on the number of strokes in the prototype. For example, a 5-space contains prototypes having five strokes.

Another recognizer, which is similar in many respects to the recognizer described in the '629 patent, is described in commonly-owned U.S. Pat. No. 6,094,506 ('506 patent), titled "Automatic Generation of Probability Tables for Handwriting Recognition Systems," which patent is also incorporated by reference herein. In that recognizer, each stroke of an input character is also described by a five-dimensional vector representing a feature code for the stroke and the x and y coordinates of stroke start and end points. The input character is then compared against every prototype in a database having the same number of strokes as the input character. To perform this comparison, a Shape Feature Probability Matrix (SFPM) is created in which each possible shape feature corresponds to a row and to a column. Each entry in the SFPM represents a probability that, for any two characters having s strokes and having shape features $f_i$ and $f_j$ at position p (where $f_i$ is the feature code for the input stroke, $f_j$ is the feature code for the prototype stroke and p=1, 2, ... s), the characters are the same. A Position Feature Probability Table is also generated. The PFPT is a one-dimensional array containing one entry for each possible feature distance, and which is indexed by feature distance. The feature distance is calculated as $(x^j_{p1}-x^i_{p1})^2+(x^j_{p2}-x^i_{p2})^2+(y^j_{p1}-y^i_{p1})^2+(y^j_{p2}-y^i_{p2})^2$, where $(x^j_{p1},y^j_{p1})$ and $(x^j_{p2},y^j_{p2})$ are the start and end points for stroke p of the model, and where $(x^i_{p1},y^i_{p1})$ and $(x^i_{p2},y^i_{p2})$ are the start and end points for stroke p of the input ink. Each entry in the PFPT represents a probability that, for any two characters having s strokes and a feature distance D between strokes at the same position p, the characters are the same. During recognition, each input character is compared to each prototype by comparing the strokes of the input character and of the prototype; the first stroke of the input character is compared to the first stroke of the prototype character, the second stroke of the input character is compared to the second stroke of the prototype character, etc. Using the SFPM, a first number is computed by summing values obtained by indexing the first input and prototype strokes, by indexing the second input and prototype strokes, etc. Using the PFPT, a second number is computed by summing values indexed by the feature distances between the first input and prototype strokes, between the second input and prototype strokes, etc. A Match Probability value equals the sum of these first and second numbers. The prototype for which a comparison against the input character results in the highest probability of a match is considered the best match. As described in the '506 patent, the SFPM and PFPT values are based on a negative logarithmic function of the probability. Thus, the lowest Match Probability value corresponds to the highest probability of match.

For characters written in print form, few problems are presented when using one of the above-described recognizers when an input ink character having s strokes is compared to prototypes having the same number of strokes, i.e., in the s space. As used herein, "print" refers to a writing style in which a user attempts to create a character so as to mimic a standardized format, and is distinguished from machine-printed characters (e.g., typed, computer generated font, etc.). Although there are variations in the relative position and shape of strokes for a given handwritten printed character, different users generally print the character using the same number of strokes.

Challenges arise in connection with recognizing cursive handwriting. Often, a cursive representation of a particular character will connect two or more strokes into a single stroke. Strokes may also be skipped and/or rounded in cursive handwriting. In theory, a character written in s strokes in print form can be written in 1 to s strokes in cursive form. This is illustrated in FIG. 1, which shows the Simplified Chinese character having Unicode code point U+9752 (phonetically "qing," meaning "green"). The character is shown in standard form on the left side of the figure, and in progressively more cursive variations toward the right side of the figure. Although there are various techniques that may increase accuracy of cursive character recognition, these techniques typically require significantly more processing time than is required for various techniques that work well for print recognition.

In many cases, users create ink with a combination of cursive and printing (or cursive that is very similar to printing) styles of handwriting. If a recognizer could distinguish between these two styles and only apply the more time-consuming techniques where needed, substantial performance improvements could result. Accordingly, there remains a need for improved handwriting recognizers able to distinguish between cursive and print (or near-print) styles and to then apply different recognition techniques to the different styles.

SUMMARY OF THE INVENTION

The present invention addresses the above and other challenges associated with recognition of handwritten characters that may contain both cursive and print styles of writing. In at least one embodiment of the invention, input handwritten characters are first classified as print or cursive. In said embodiment, the classifier computes numerical feature values based on the shape of an input character. Each feature value is then applied to an input of an artificial neural network; the neural network outputs indicate a probability of the input character being print or cursive. If a character is classified as print, it is analyzed by a print character recognizer. If a character is classified as cursive, it is analyzed using a cursive character recognizer. In some embodiments, the cursive character recognizer compares the input character to multiple prototype characters using a Dynamic Time Warping (DTW) algorithm.

These and other features and advantages of the present invention will be readily apparent and fully understood from the following detailed description of various embodiments, taken in connection with the appended drawings.

BRIEF DESCRIPTION OF THE DRAWINGS

FIG. 24 is a table showing example inputs to, and outputs from, the print or cursive classifier of FIG. 5 for the ink of FIGS. 7 and 8.

DETAILED DESCRIPTION OF THE PREFERRED EMBODIMENTS Terms

Unless otherwise specified, the following terms have the following meanings throughout this specification and the claims.

"Ink" or "electronic ink" refers to a sequence or a set of strokes with properties. The sequence of strokes may include strokes ordered, for example, by the time captured. Each stroke is comprised of a sequence of points, which may be represented using a variety of known techniques including Cartesian coordinates (X, Y), polar coordinates (r, $\Theta$), and other techniques.

A "stroke" refers to a sequence or set of captured points. For example, when rendered, the sequence of points may be connected with lines. Alternatively, the stroke may be represented as a point and a sequence of vectors in the direction of the next point. A stroke is intended to encompass any representation of points or segments relating to ink, irrespective of the underlying representation of points and/or what connects the points.

A "character" is a letter or symbol having a defined meaning. Characters can also be code points (e.g., UNICODE or ASCII elements) or can be letters or symbols for a particular language. Characters may also generally be shapes, for example, squares, triangles or circles.

General Purpose Computing Environment

Figure 2:
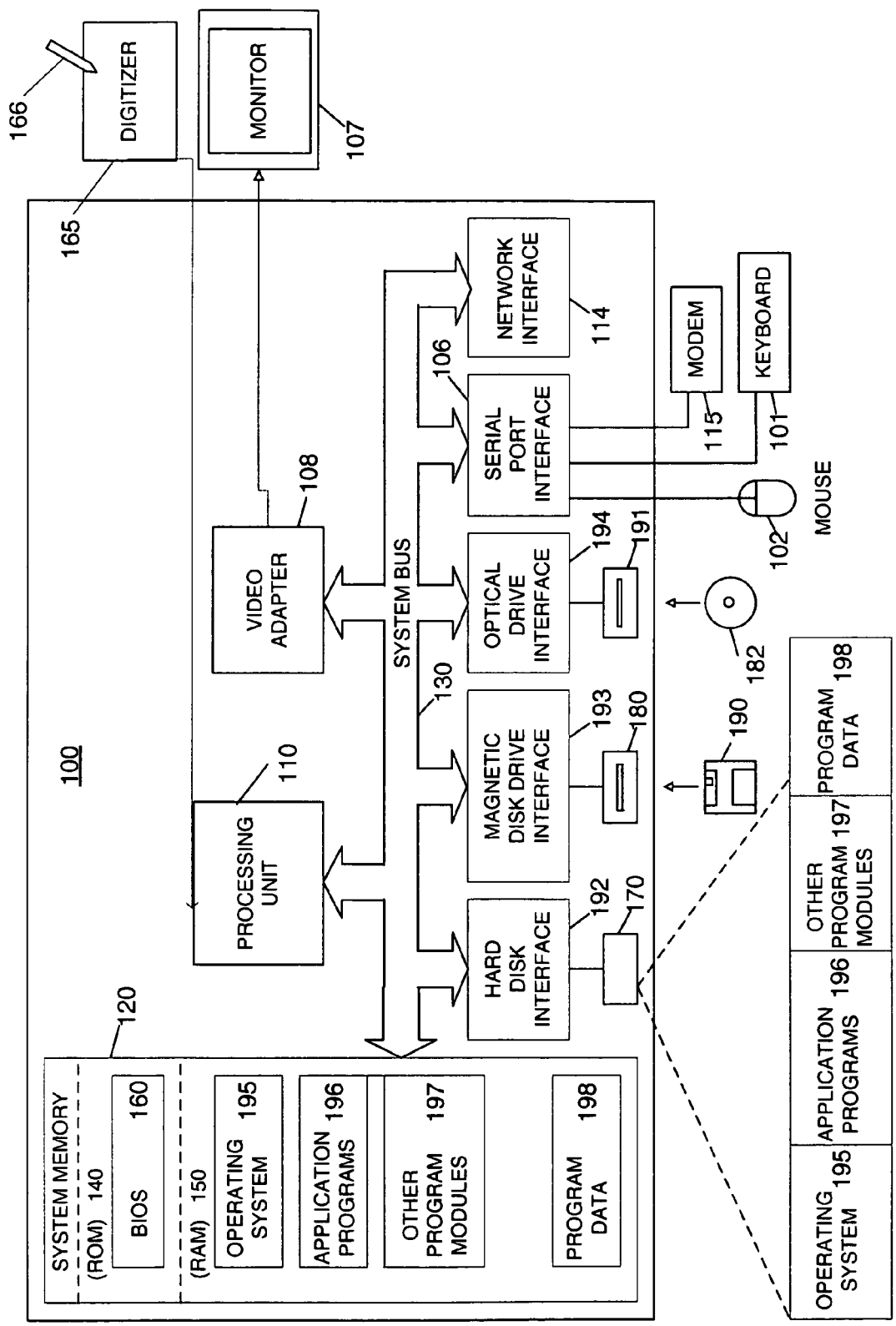
FIG. 2 is a block diagram of a general-purpose digital computing environment that can be used to implement various aspects of the invention.

FIG. 2 illustrates a schematic diagram of an exemplary conventional general-purpose digital computing environment that can be used to implement various aspects of the invention. The invention may also be implemented in other versions of computer 100, for example without limitation, a hand-held computing device or a Tablet PC. The invention may also be implemented in connection with a multiprocessor system, a microprocessor-based or programmable consumer electronic device, a network PC, a minicomputer, a mainframe computer, hand-held devices, and the like. Hand-held devices available today include Pocket-PC devices manufactured by Compaq, Hewlett-Packard, Casio, and others.

Computer 100 includes a processing unit 110, a system memory 120, and a system bus 130 that couples various system components including the system memory to the processing unit 110. The system bus 130 may be any of various types of bus structures including a memory bus or memory controller, a peripheral bus, and a local bus using any of a variety of bus architectures. The system memory 120 includes read only memory (ROM) 140 and random access memory (RAM) 150.

A basic input/output system 160 (BIOS), which is stored in the ROM 140, contains the basic routines that help to transfer information between elements within the computer 100, such as during start-up. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 182 such as a CD ROM, DVD or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules and other data for computer 100. It will be appreciated by those skilled in the art that other types of computer readable media may also be used.

A number of program modules can be stored on the hard disk drive 170, magnetic disk 190, optical disk 182, ROM 140 or RAM 150, including an operating system 195, one or more application programs 196, other program modules 197, and program data 198. A user can enter commands and information into the computer 100 through input devices such as a keyboard 101 and/or a pointing device 102. These and other input devices are often connected to the processing unit 110 through a serial port interface 106 that is coupled to the system bus, but may be connected by other interfaces, such as a parallel port, game port, a universal serial bus (USB) or a BLUETOOTH interface. Further still, these devices may be coupled directly to the system bus 130 via an appropriate interface (not shown). A monitor 107 or other type of display device is also connected to the system bus 130 via an interface, such as a video adapter 108.

In one embodiment, a pen digitizer 165 and accompanying pen or stylus 166 are provided in order to digitally capture freehand input. Although a direct connection between the pen digitizer 165 and the processing unit 110 is shown, in practice, the pen digitizer 165 may be coupled to the processing unit 110 via a serial port, parallel port or other interface and the system bus 130 as known in the art. Furthermore, although the digitizer 165 is shown apart from the monitor 107, it is preferred that the usable input area of the digitizer 165 be co-extensive with the display area of the monitor 107. Further still, the digitizer 165 may be integrated in the monitor 107, or may exist as a separate device overlaying or otherwise appended to the monitor 107.

Figure 3:
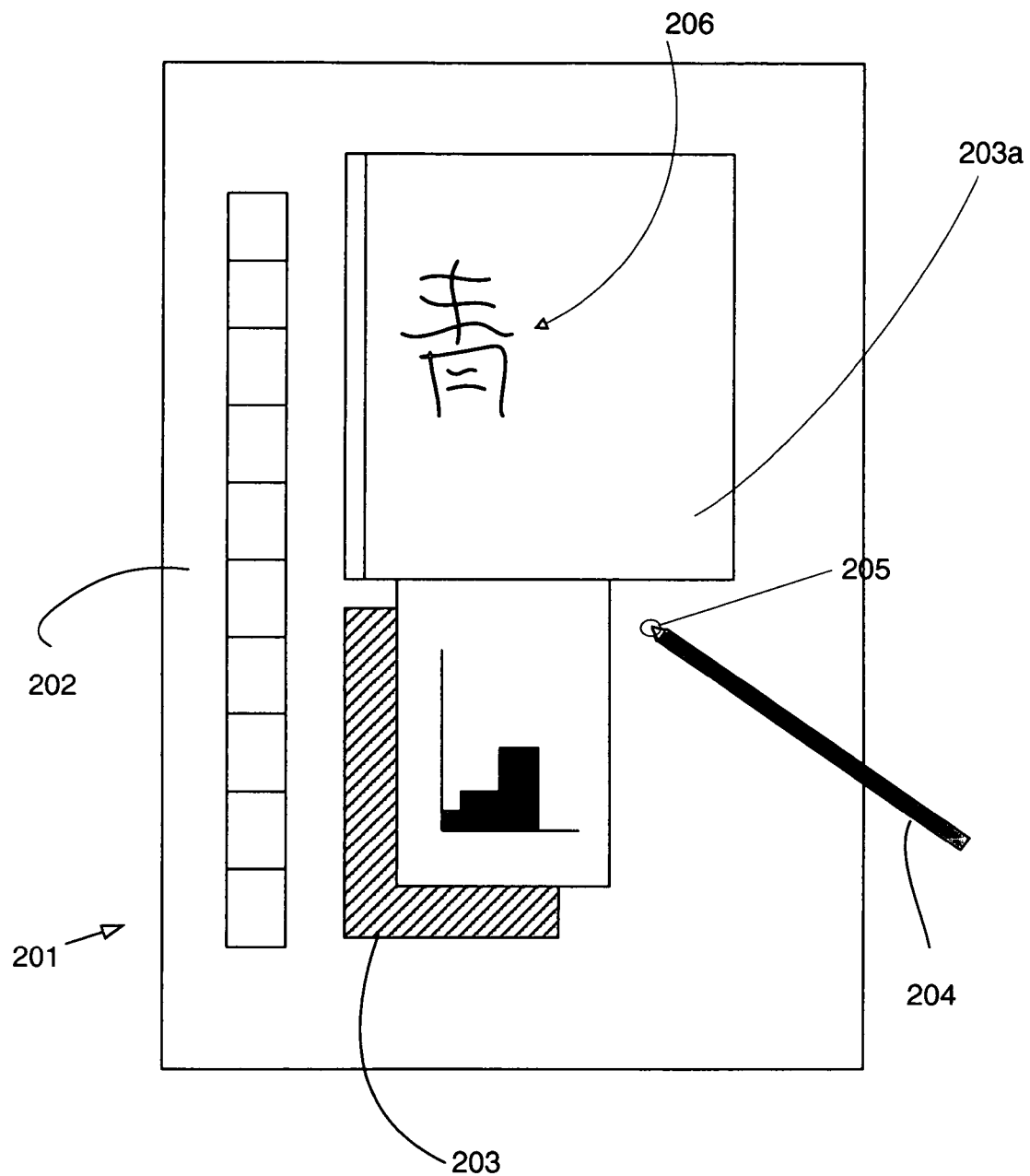
FIG. 3 is a block diagram of an exemplary hand-held device or tablet PC that can be used in accordance with various aspects of the invention.

FIG. 3 illustrates an example of a hand-held device or Tablet PC 201 that can be used in accordance with various aspects of the invention. Any or all of the features, subsystems, and functions in the system of FIG. 2 can be included in the computer of FIG. 3. Hand-held device or Tablet PC 201 includes a large display surface 202, e.g., a digitizing flat panel display, preferably, a liquid crystal display (LCD) screen, on which a plurality of windows 203 is displayed. Using stylus 204, a user can select, highlight, and/or write on the digitizing display surface 202. Hand-held device or Tablet PC 201 interprets gestures made using stylus 204 in order to manipulate data, enter text, create drawings, and/or execute conventional computer application tasks such as spreadsheets, word processing programs, and the like. For example, a window 203a allows a user to create electronic ink 206 using stylus 204.

The stylus 204 may be equipped with one or more buttons or other features to augment its selection capabilities. In one embodiment, the stylus 204 could be implemented as a "pencil" or "pen," in which one end constitutes a writing portion and the other end constitutes an "eraser" end, and which, when moved across the display, indicates portions of the display are to be erased. Other types of input devices, such as a mouse, trackball, or the like could be used. Additionally, a user's own finger could be the stylus 204 and used for selecting or indicating portions of the displayed image on a touch-sensitive or proximity-sensitive display. Region 205 shows a feedback region or contact region permitting the user to determine where the stylus 204 has contacted the display surface 202.

Improving Template-Based Cursive Handwriting Recognition

Although the invention is described by example of East Asian character recognition, the invention is not limited thereby. The invention may also be used for recognition of Latin, Greek and Cyrillic alphabets, for recognition of Hindi, Arabic and other written languages, and for other types of character or image recognition.

Figure 4:
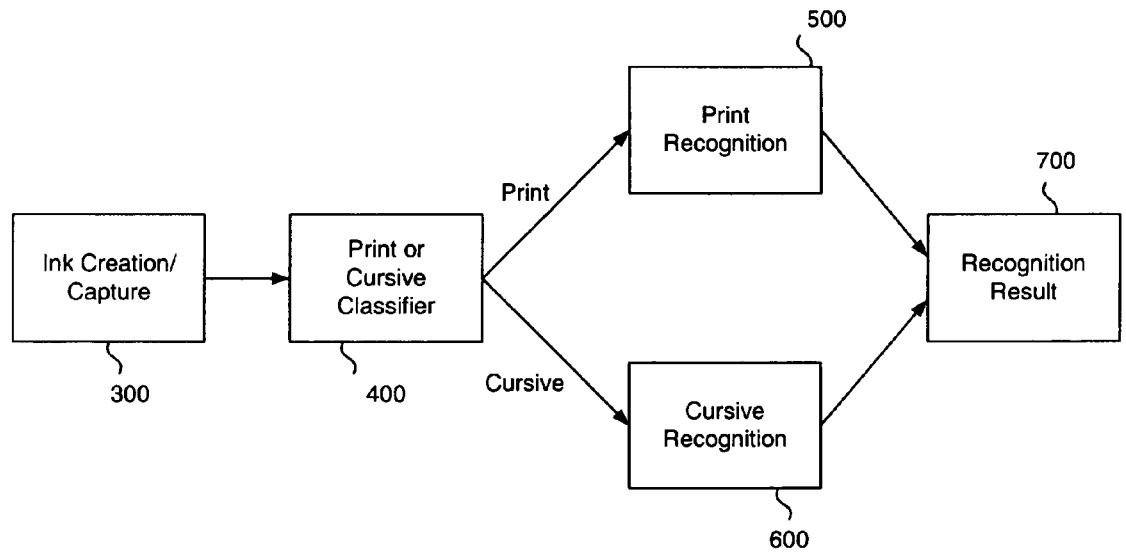
FIG. 4 is a block diagram showing operation of at least one embodiment of the invention.

FIG. 4 is a block diagram showing operation of the invention according to at least one embodiment. At block 300, a user creates an electronic ink representation of a character. In one embodiment, the user creates this ink by moving a writing device across a tablet, and a computer generates data for a series of points on a display over which the writing device is moved. At block 400, a print-or-cursive classifier 400 analyzes the electronic ink, and determines whether that ink is a cursive or printed character. The operation of classifier 400 is further described below. If classifier 400 determines that the ink is printed handwriting, the ink is then processed by print recognizer 500. In at least one embodiment of the invention, print recognizer 500 operates as described in U.S. Pat. No. 5,729,629, previously incorporated by reference. In other embodiments, print recognizer 500 operates as described in U.S. Pat. No. 6,095,506, also previously incorporated by reference. After processing by print recognizer 500, a recognition output (e.g., a Unicode value) is provided at block 700. If classifier 400 determines that the input ink is cursive handwriting, the ink is instead processed by cursive recognizer 600. Cursive recognizer 600, also described in more detail below, provides a recognition output at block 700.

Figure 5:
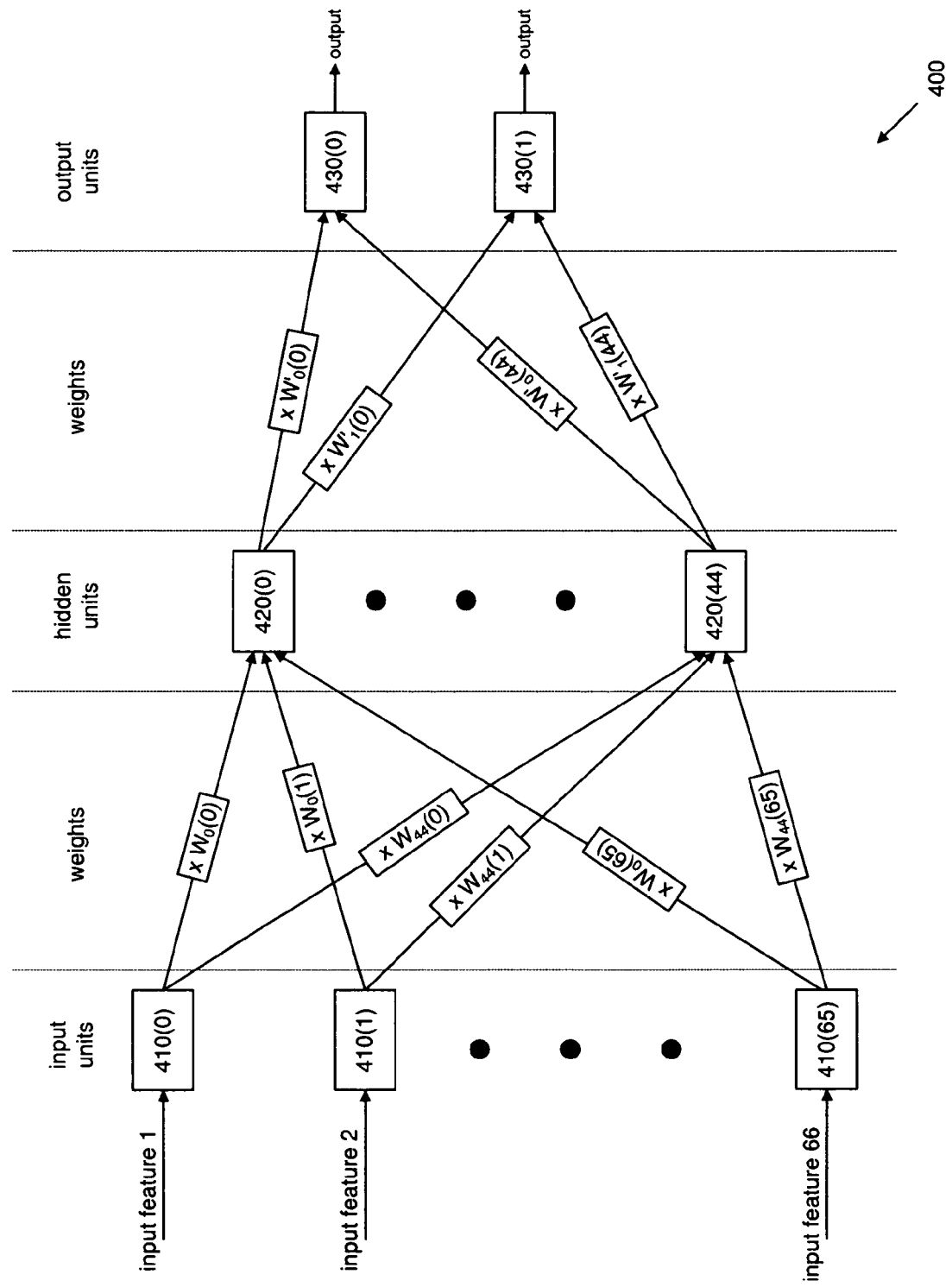
FIG. 5 is a block diagram for a print-or-cursive classifier according to at least one embodiment of the invention.
Figure 6:
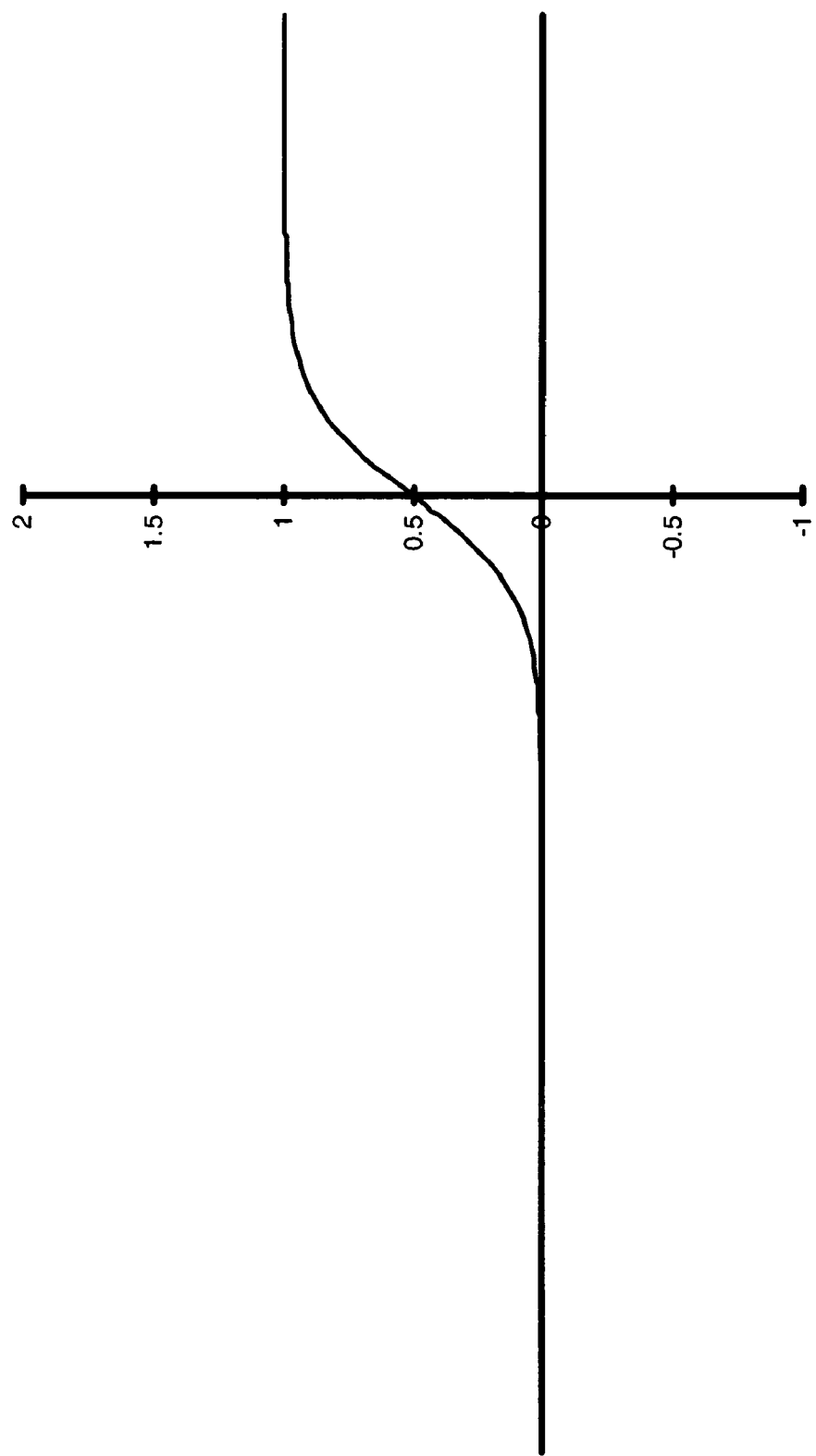
FIG. 6 is a graph illustrating a sigmoid function applied by a hidden unit of FIG. 5.

FIG. 5 is a block diagram for print-or-cursive classifier 400 according to at least one embodiment. Classifier 400 is implemented as a fully-connected, feed-forward artificial neural network. Classifier 400 has 66 input units, shown in FIG. 5 as blocks 410(0) through 410(65). So as not to obscure the drawing with unnecessary detail, only three input units 410 are shown in FIG. 5, the remaining input units being represented by a vertical ellipsis. Each of inputs 410(0) through 410(65) receives a numerical value for a feature of an input ink character. Each input to an input unit 410 is applied to each of 45 hidden units 420(0) through 420(44). Similar to input units 410, only two hidden units 420 are shown, the remainder being represented by a vertical ellipsis. Each hidden unit 420 applies a separate weight W to each input. The weights are represented in FIG. 5 by boxes labeled "x W_( )," where "_" is a hidden unit and "( )" is an input unit. Each hidden unit 420 is a sigmoid unit. In particular, each hidden unit weights and sums the 66 inputs received from input units 410(0) through 410(65), and then maps that sum to a curve (FIG. 6) generated by the sigmoid function $y=1/(1+e^{-x})$.

The outputs of hidden units 420(0) through 420(44) are then applied to each of output units 430(0) and 430(1). Each output unit 430 applies a weight W'_( ) to the inputs received from each hidden unit 420 (where "_" is an output unit and "( )" is a hidden unit), sums the weighted inputs and maps the sum to the sigmoid function of FIG. 6. Output unit 430(0) corresponds to the probability of an input ink sample being cursive handwriting, and output unit 430(1) corresponds to the probability of an input ink sample being print handwriting. In at least one embodiment, if output 430(0) is greater than output 430(1) for a particular ink character, the character is classified as cursive. In other embodiments, an ink character is classified as cursive if 430(0)>r*430(1), where r is a constant. In still other embodiments, the value of r is value between approximately 1.2 and 1.8.

Figure 1:
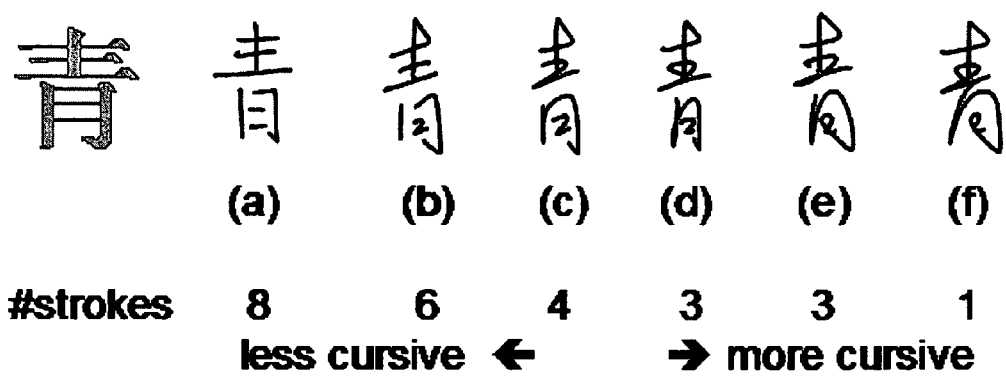
FIG. 1 shows progressively more cursive forms of a Chinese character.
Figure 7:
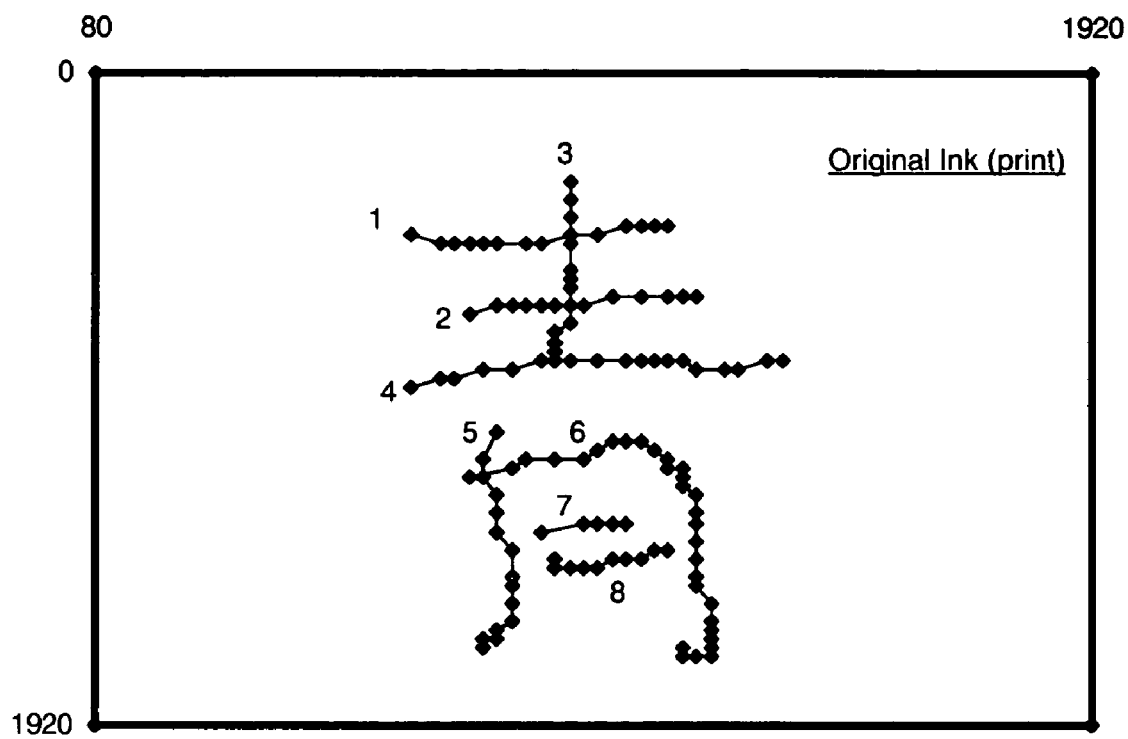
FIG. 7 is an example of print ink for a Chinese character.
Figure 8:
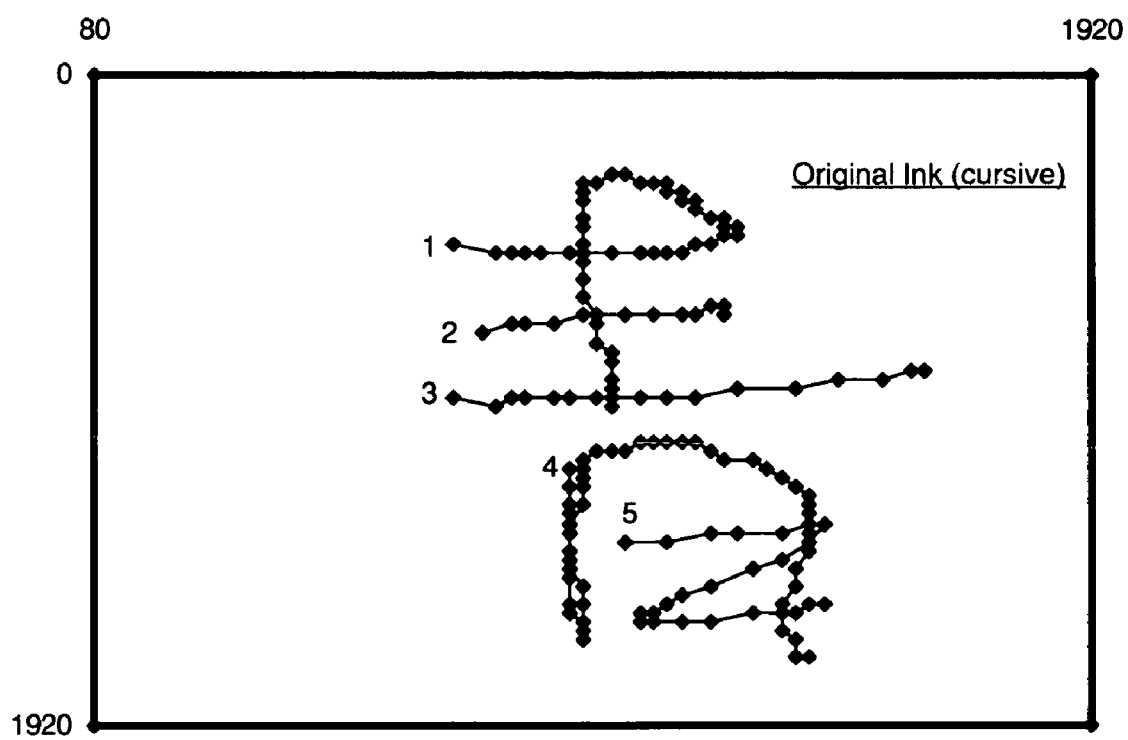
FIG. 8 is an example of cursive ink for a Chinese character.

As previously indicated, classifier 430 has 66 input units in at least one embodiment of the invention. FIGS. 7 through 24 illustrate, according to at least one embodiment, calculation of the feature data provided as inputs to the 66 input units. Shown in FIGS. 7 and 8, respectively, are examples of print and cursive ink for the same character shown in FIG. 1. One feature provided to an input unit 410 of classifier 400 is the number of strokes in the ink character. As shown in FIGS. 7 and 8, the print ink has eight strokes, while the cursive ink has five strokes. A second feature provided to another input unit is the quantity 1−(1/no. of strokes), which is 0.875 and 0.80, respectively, for the ink of FIGS. 7 and 8.

Figure 9:
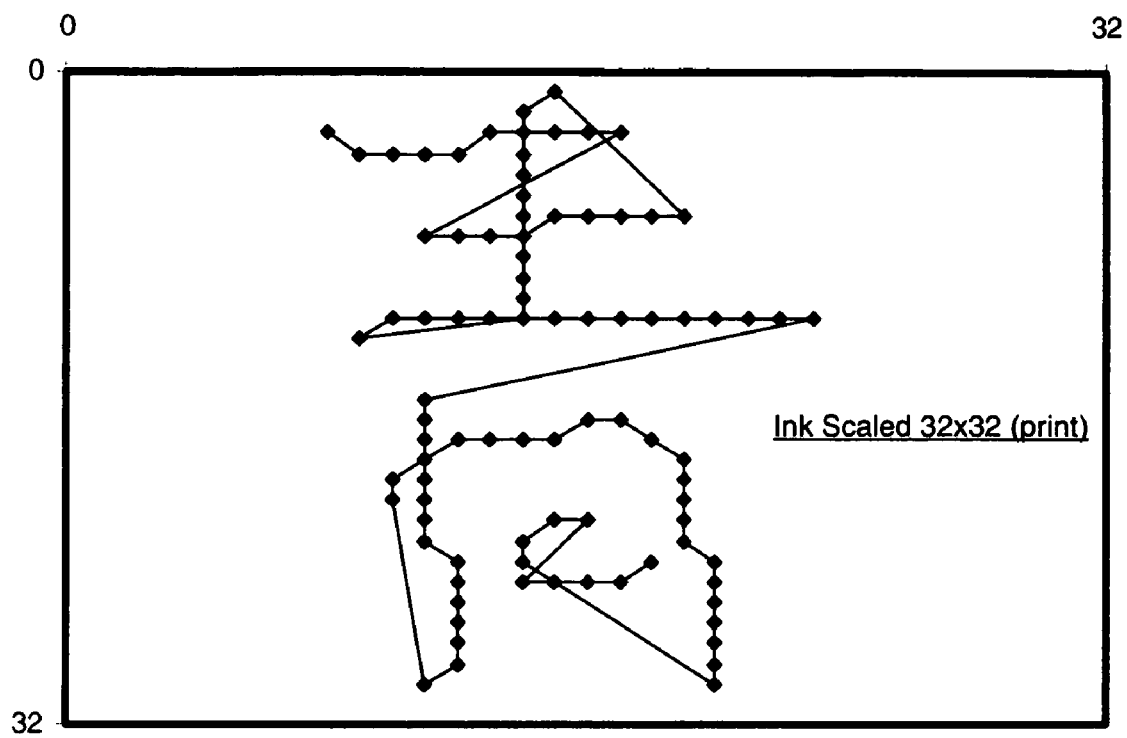
FIGS. 9 and 10 respectively show modification of the ink in FIGS. 7 and 8 for calculation of feature data.
Figure 10:
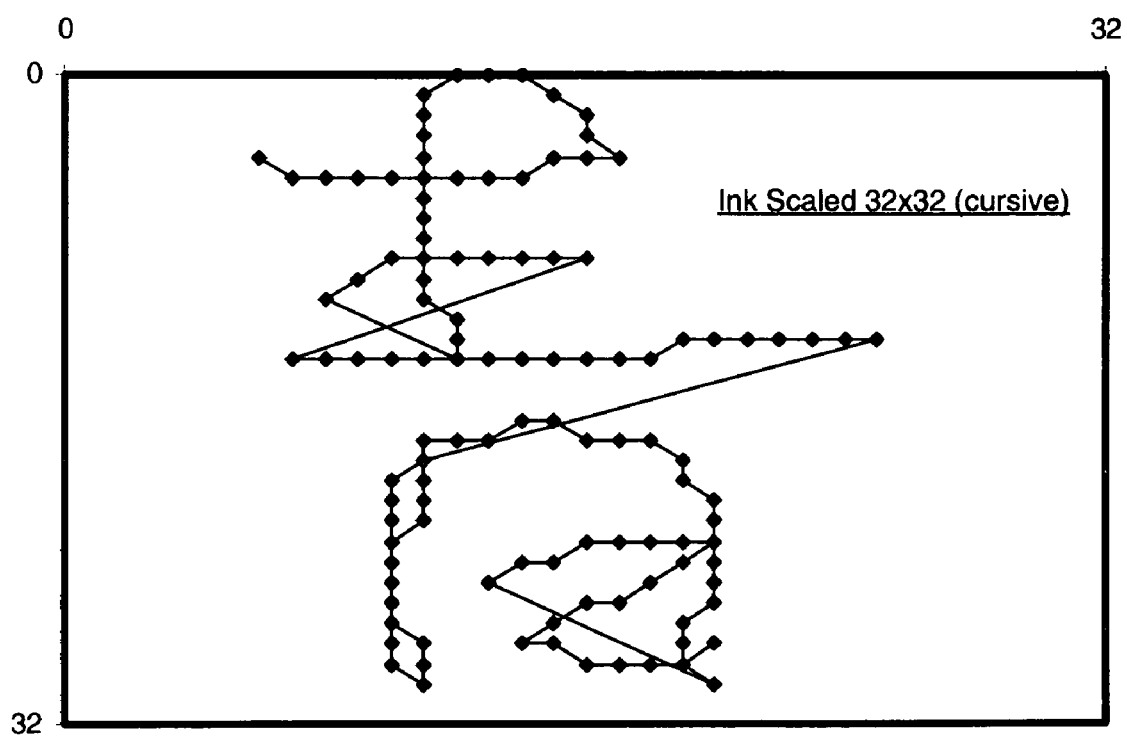
Figure 11:
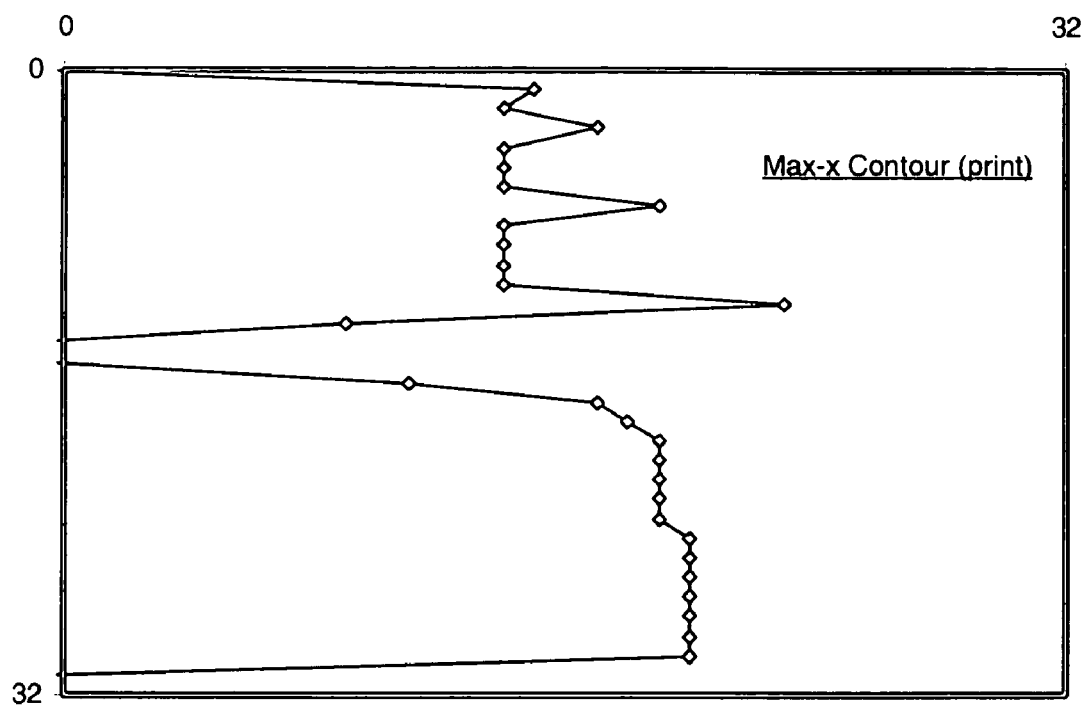
FIGS. 11 and 12 respectively show a "Max-x" contour for the data of FIGS. 9 and 10.
Figure 12:
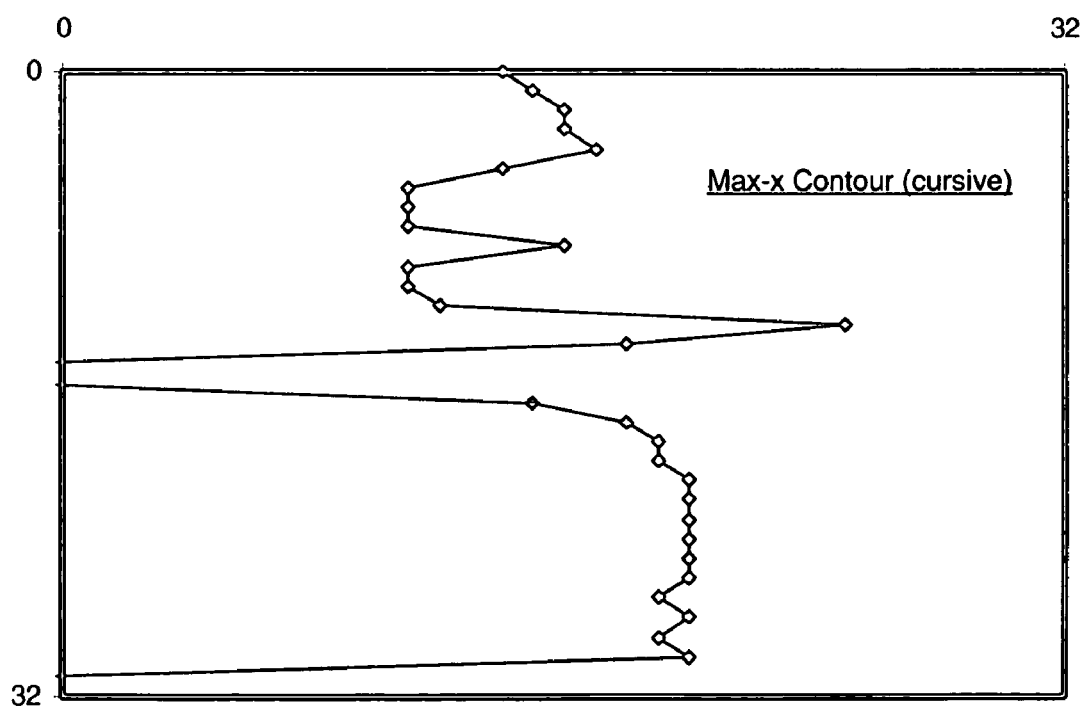
Figure 13:
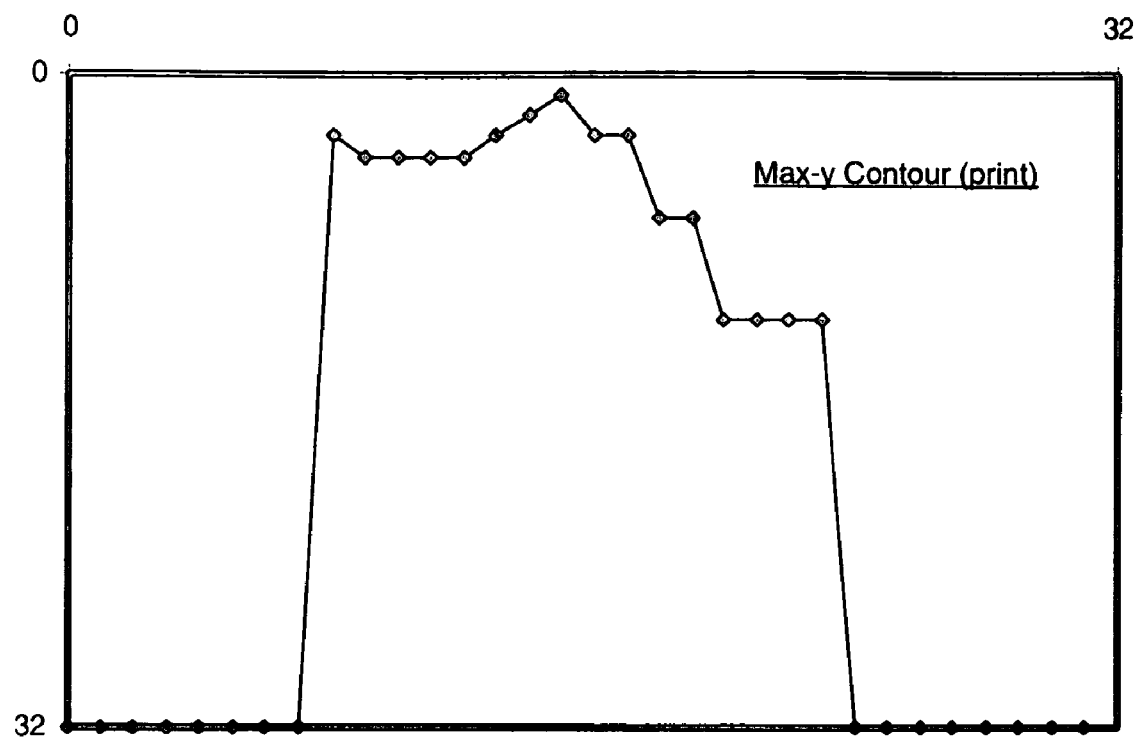
FIGS. 13 and 14 respectively show a "Max-y" contour for the data of FIGS. 9 and 10.
Figure 14:
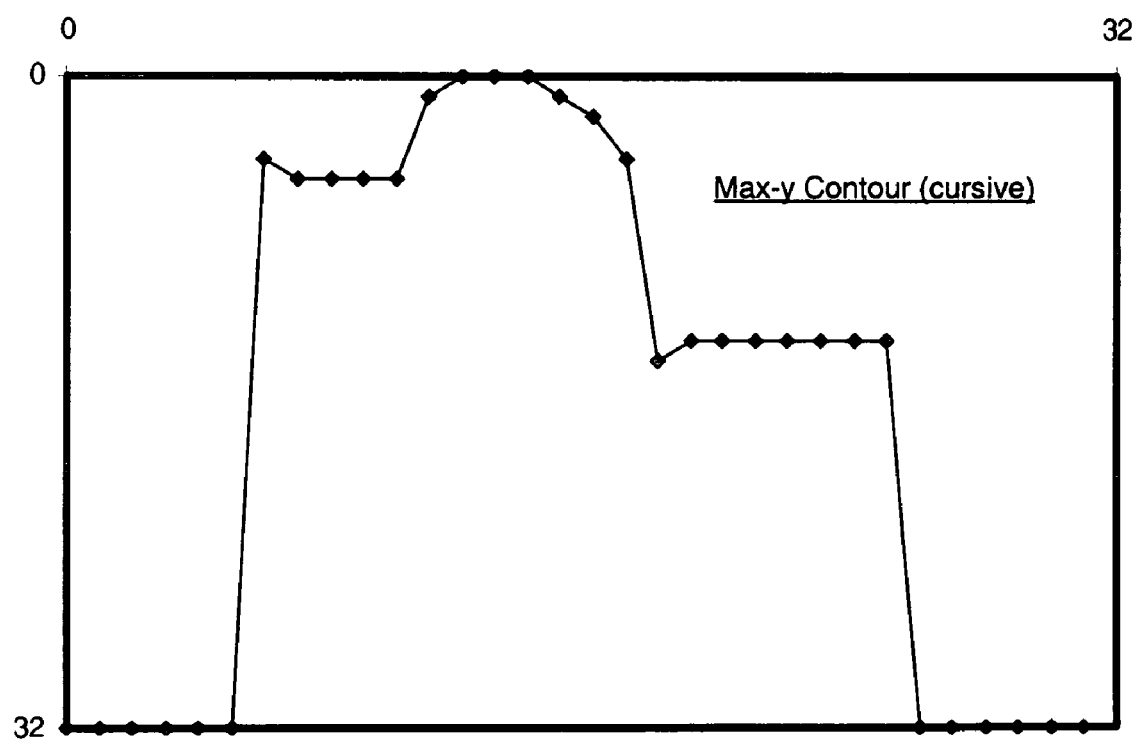
Figure 15:
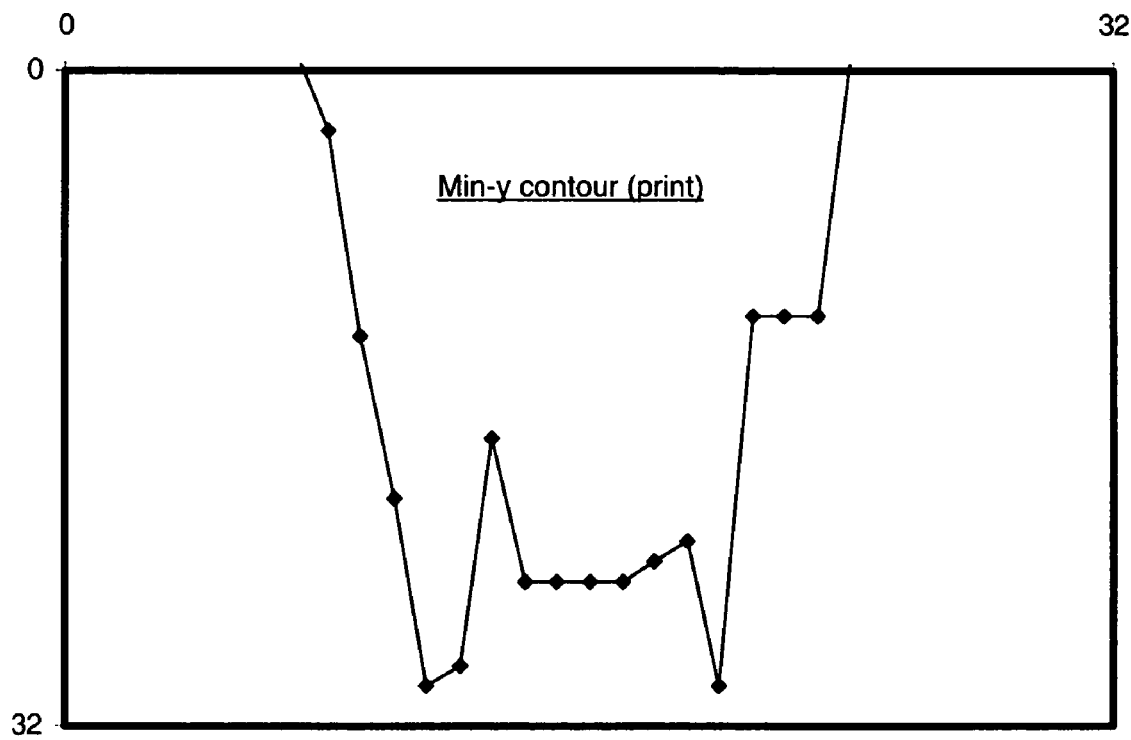
FIGS. 15 and 16 respectively show a "Min-y" contour for the data of FIGS. 9 and 10.
Figure 16:
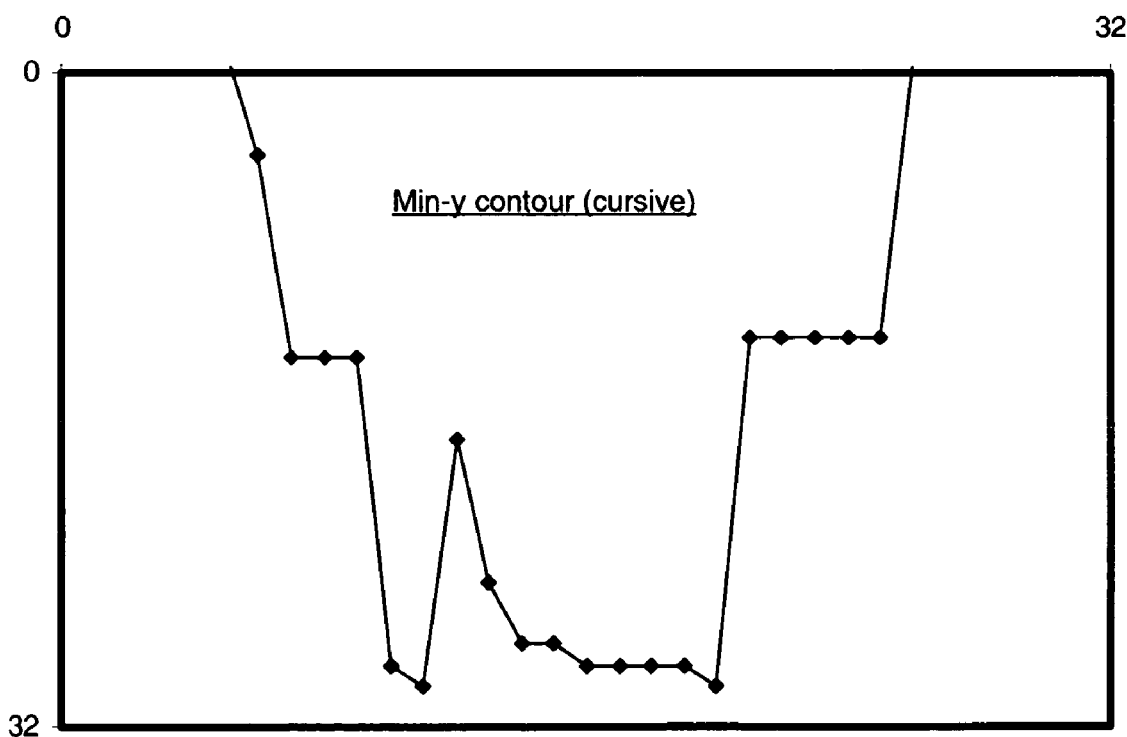

FIGS. 9 and 10 illustrate how the ink of FIGS. 7 and 8 is modified to calculate additional features. Although FIGS. 9 and 10 illustrate modified versions of the images of FIGS. 7 and 8, this is only for purposes of explanation. In practice, such a modified version of the input ink would not necessarily be displayed to a user. The ink is first joined into a single large stroke by connecting the end of each stroke to the beginning of the next. The ink is also resampled, so that each point along the stroke is an equal distance from the previous point. In at least one embodiment, this distance is 0.2 *yDev, where yDev is the average absolute distance (in the y direction) of each point from the average y coordinate. The joined ink strokes are then scaled to fill a 32 pixel by 32 pixel image, and the coordinates of the ink are rounded to integers in the 32×32 grid. FIG. 9 is a joined and scaled image for the ink of FIG. 7, and FIG. 10 is a joined and scaled image for the ink of FIG. 8. For each of the 32 vertical units, the rightmost pixel of the ink is noted, thus providing an array of 32 values ("Max-x contour"). FIG. 11 graphically shows the Max-x contour for the data of FIG. 9, and FIG. 12 shows the Max-x contour for the data of FIG. 10. In a similar manner, and as shown in FIG. 13, the highest ink pixel along the 32 horizontal units in the data of FIG. 9 is noted, forming the contour Max-y. FIG. 14 shows Max-y for the data of FIG. 10. Next, a "Min-y" contour is formed for the lowest ink pixel. FIGS. 15 and 16 show the Min-y contours for the data of FIGS. 9 and 10. Each of the Max-x, Min-y and Max-y contours is then represented as a set of 10 coefficients for a Chebyshev polynomial approximating the contour. Representation of functions using Chebyshev approximation is well known in the art, and is described in, e.g., W. Press, et al., *Numerical Recipes in C: the Art of Scientific Computing*, Chapter 5.8 (Cambridge University Press, 1992). Representation of a sequence of values as a Chebyshev polynomial is also described in commonly-owned U.S. patent application Ser. No. 10/104,453 (published under No. 2002/0097910 on Jul. 25, 2002), filed Mar. 22, 2002 and titled "Feature Extraction for Real-Time Pattern Recognition Using Single Curve Per Pattern Analysis," which application is incorporated by reference herein. Each set of 10 coefficients is scaled by the standard deviation for those 10 coefficients. Each scaled coefficient (30 in all) is then provided to a separate input unit 410.

Figure 17:
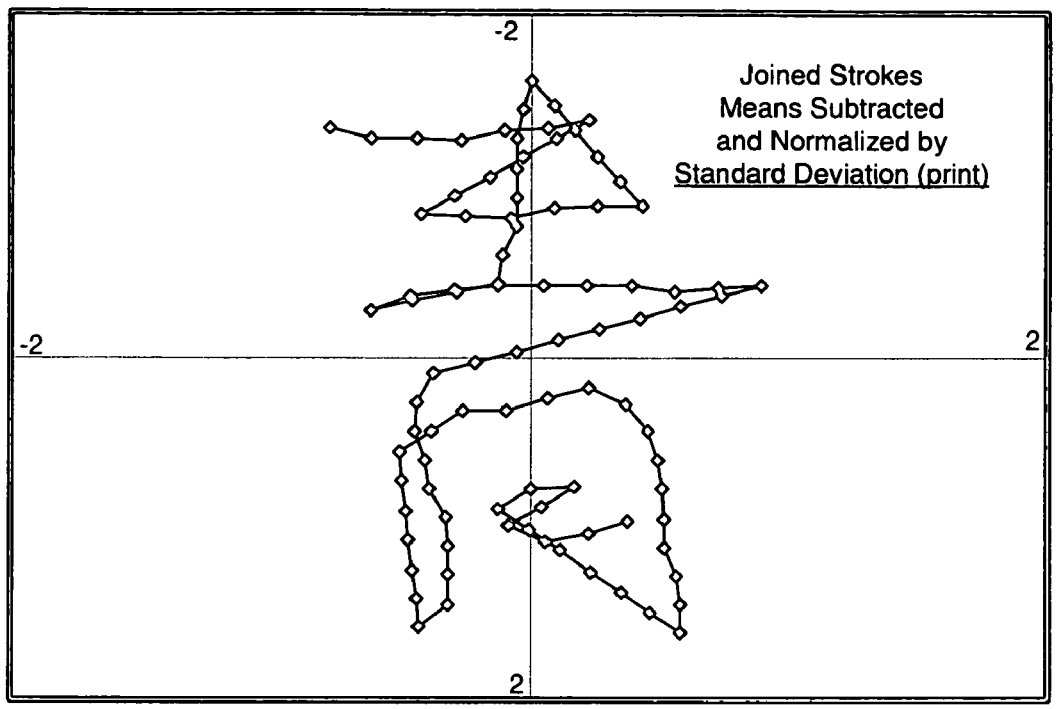
FIGS. 17 and 18 respectively show modification of the data of FIGS. 7 and 8 for calculation of additional feature data.
Figure 18:
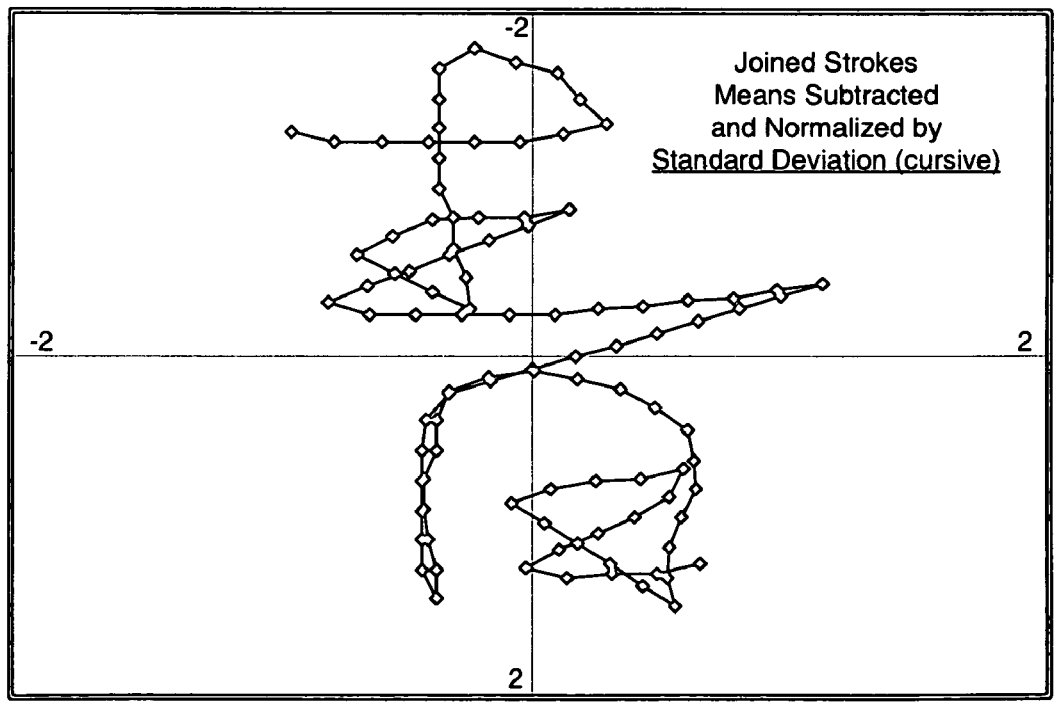

FIGS. 17 and 18 illustrate how the data for the images of FIGS. 7 and 8 are modified to obtain the next 26 features for input into classifier 300. As with FIGS. 9 and 10, FIGS. 17 and 18 are only provided for purposes of explanation, and the modified ink of FIGS. 17 and 18 would not necessarily be displayed to a user. The ink is again joined into a single large stroke by connecting the end of each stroke to the beginning of the next. The ink is also resampled, so that each point along the stroke is an equal distance from the previous point. In at least one embodiment, this distance is 0.2 *yDev, where yDev is the average absolute distance (in the y direction) of each point from the average y coordinate. The mean of all x coordinates is calculated and subtracted from each x coordinate to yield a sequence of (x-mean) values. Each (x-mean) value is then divided by the standard deviation of those (x-mean) values to yield a sequence of normalized x values. In a similar manner, the mean of all y coordinates is calculated and subtracted from each y coordinate to yield a sequence of (y-mean) values. Each (y-mean) value is then divided by the standard deviation of those (y-mean) values to yield a sequence of normalized y values. FIG. 17 shows the data of FIG. 7 thus normalized. FIG. 18 shows the data of FIG. 8 after the same steps.

The normalized x values are then converted to another set of 10 Chebyshev polynomial coefficients. These 10 coefficients are then scaled by their standard deviation, and the first coefficient (which is zero because of the earlier subtraction of the mean) is discarded. Each of the remaining 9 coefficients is provided to a separate input unit 410. The normalized y values are also converted to another set of 10 Chebyshev polynomial coefficients. These 10 coefficients are also scaled by their standard deviation, and the first coefficient (which is zero because of the earlier subtraction of the mean) is discarded. Each of the remaining 9 coefficients is provided to a separate input unit 410.

Figure 19:
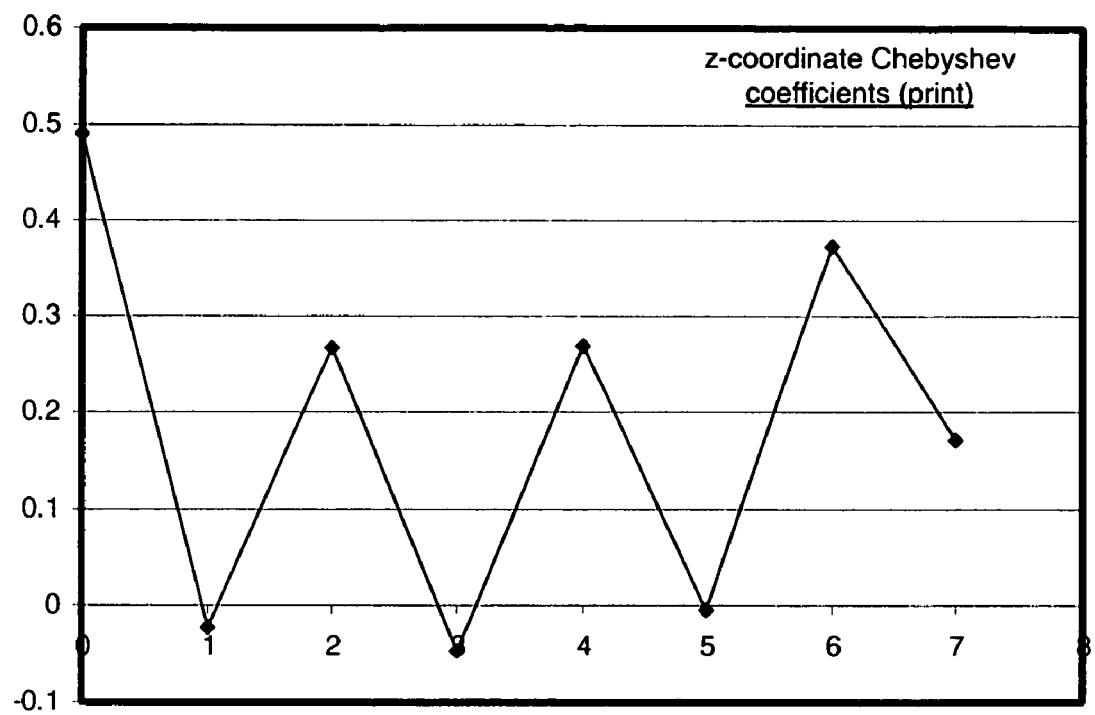
FIGS. 19 and 20 are graphs of z-coordinate Chebyshev coefficients for the data of FIGS. 17 and 18.
Figure 20:
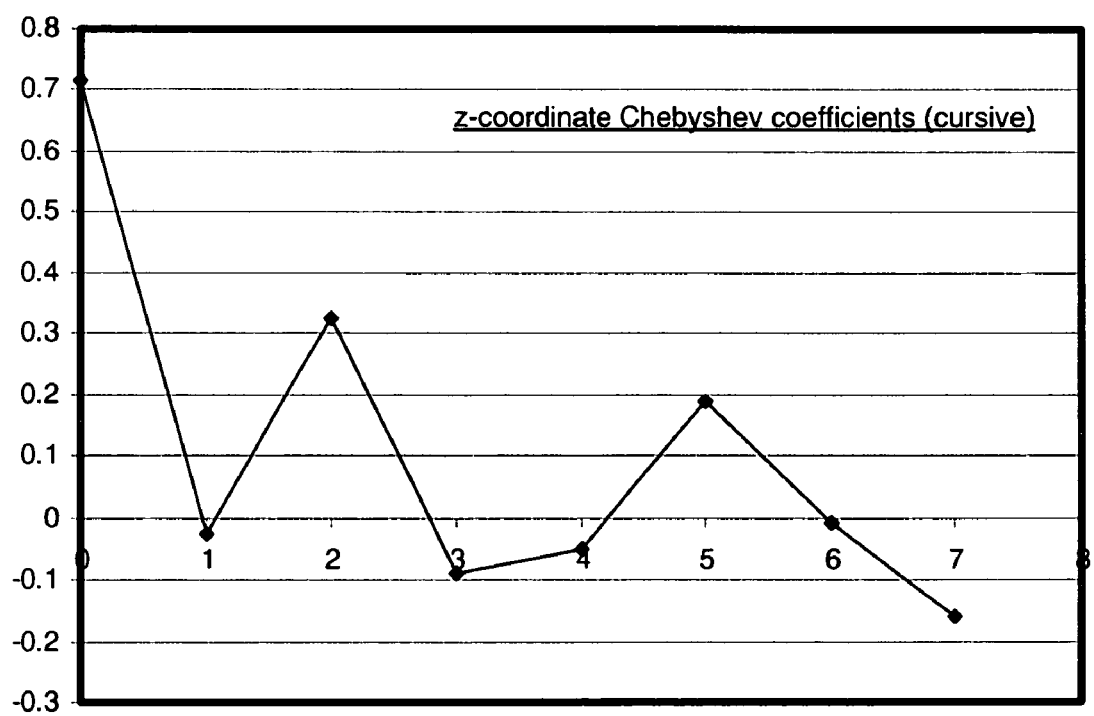

A z coordinate is then synthesized for each of the points in the data of FIGS. 17 and 18. The z coordinate is 0 for each point that corresponds to the first point of each of the original strokes combined to form a single stroke, and is 1 for the remaining points. The z coordinates are not further normalized, and are directly converted to an additional set of 8 Chebyshev polynomial coefficients. The z-coordinate Chebyshev coefficients are scaled by their standard deviation, and each is then provided to a separate input unit 410. FIGS. 19 and 20 are graphs of the z-coordinate Chebyshev coefficients for the data of FIGS. 17 and 18.

Figure 21:
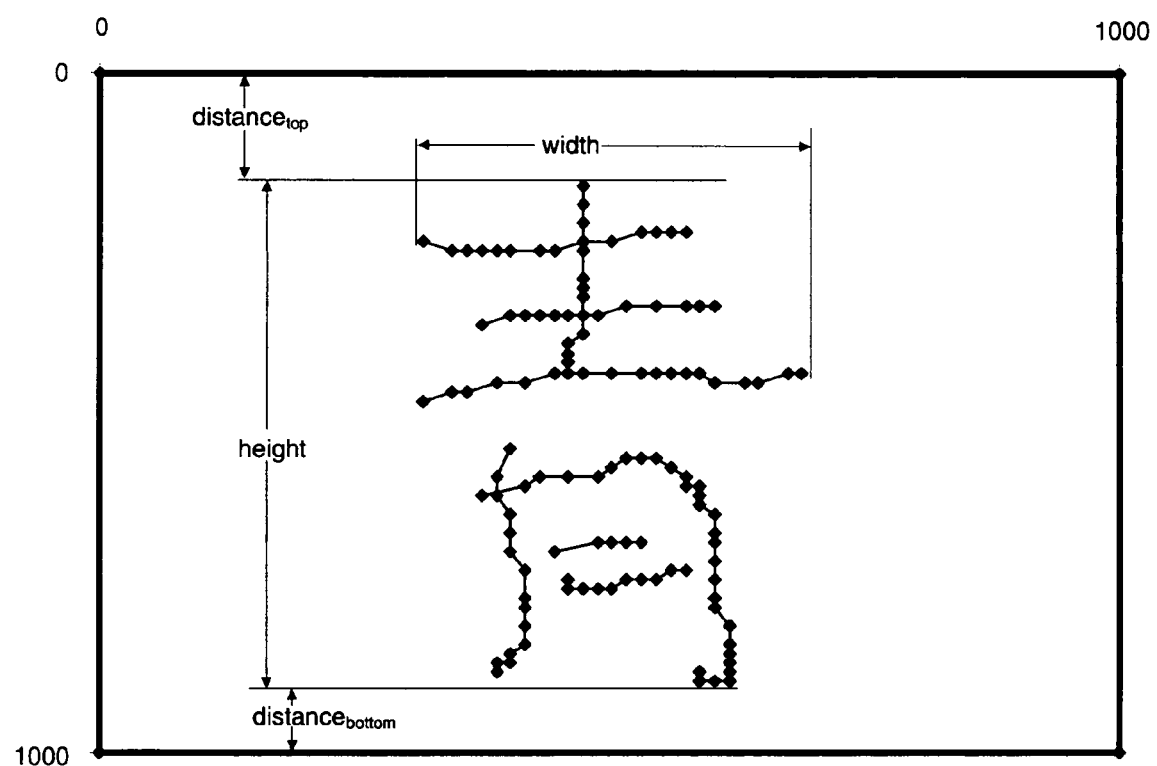
FIGS. 21 and 22 respectively illustrate calculation of additional feature data for the ink of FIGS. 7 and 8.
Figure 22:
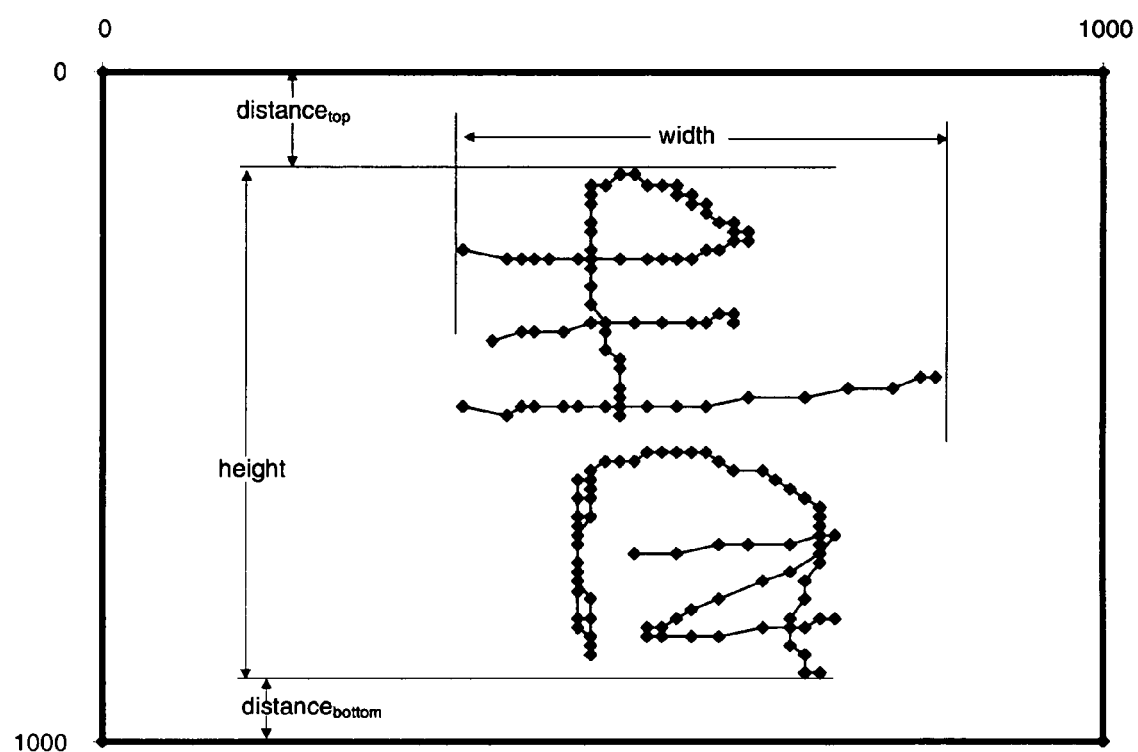

Five additional features are then calculated based on the position of the ink in a fixed writing box 1000 units in width×1000 units in length. In other words, the writing box containing the original ink character is scaled to 1000 units by 1000 units, as shown in FIGS. 21 and 22. The relative location of the ink in the writing box is the position in which the user placed the ink when writing the character. One feature (distance$_{top}$) is the distance from the top edge of the box to the top of the character. The next feature (distance$_{bottom}$) is the distance from the bottom edge of the box to the bottom of the character. The next feature is the width of the character, and yet another feature is the ratio of the character width to the width+height. An additional feature (not shown) represents the mean y coordinate position of the ink relative to the 1000 unit×1000 unit writing box.

Figure 23:
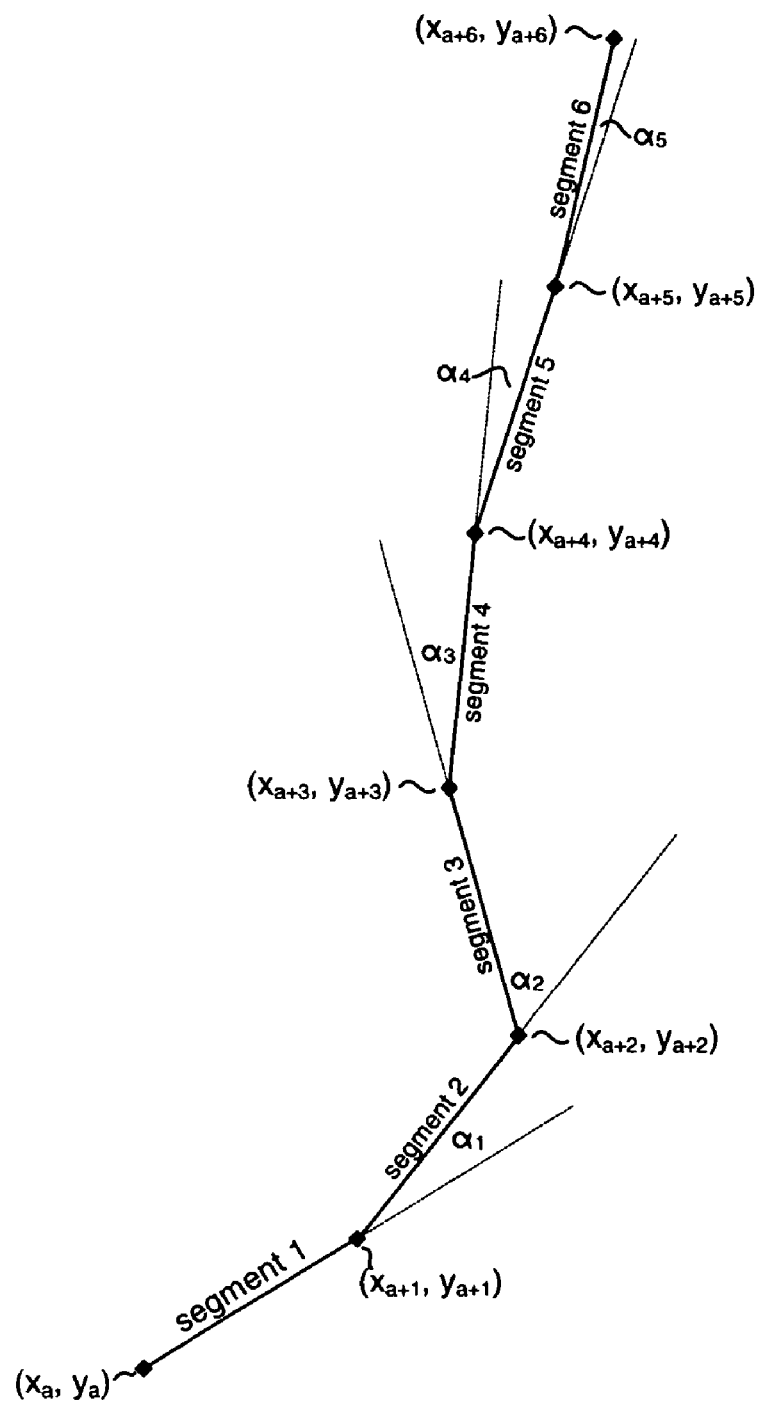
FIG. 23 is an example of calculating stroke curvature according to at least one embodiment of the invention.

Three additional features are then calculated based on the curvature of the original ink, as shown in FIG. 23 using a single ink stroke as an example. As shown in FIG. 23, the example stroke is made up of multiple segments (segment 1, segment 2, etc.). Each segment is bounded by one of the points ($x_a, y_a$, $x_{a+1}, y_{a+1}$, etc.) on the stroke; these points could correspond, e.g., to the location of a stylus when its position is sampled by a digitizer. Each stroke of the ink is traversed from beginning to end, and the angles between every segment formed by points on the ink are measured. In other words, the ink is viewed from the perspective of an imaginary person walking along a path corresponding to the ink stroke. If the path turns to the left as the imaginary walker proceeds from one segment to the next, the angle of that turn is measured and given a positive value. If the path turns to the right, the angle is measured and given a negative value. One feature equals the total, over all ink strokes, of the total of all angles between adjacent segments. For the ink stroke in FIG. 23, this is $\alpha_1 + \alpha_2 + \alpha_3 + \alpha_4 + \alpha_5$. Another feature is the total, over all ink strokes, of the absolute value of the angles between adjacent segments. For the ink stroke in FIG. 23, this is $|\alpha_1| + |\alpha_2| + |\alpha_3| + |\alpha_4| + |\alpha_5|$. Finally, another feature is the maximum angle between any three successive points along any of the strokes of an ink character.

FIG. 24 gives example values for the 66 input features for the original ink of FIGS. 7 and 8.

In one embodiment, the neural network of classifier 400 is trained using the back propagation algorithm. Back propagation algorithm training of a neural network is known in the art, and thus not described in detail herein. Further details of back propagation training of artificial neural networks can be found in, e.g., C. Bishop, *Neural Networks for Pattern Recognition* (Oxford Univ. Press 1996) and J. Hertz, et al., *Introduction to the Theory of Neural Computation* (Addison-Wesley 1991). In at least one embodiment of the invention, a training set consisting of an equal number of print and cursive characters is developed. In particular, numerous individuals are instructed, for each of multiple East Asian characters, to write each character twice: once in a neat print form and once in cursive. The 66 input features (described above) are then calculated for each character of the writing samples obtained. After initializing the weights W_(0) through W_(65) and W'_(0) through W'_(44) to random values, the input features for each printed/cursive character pair are applied to input units 410(0) through 410(65), the error derivative (EW) for each weight calculated, and the weight values adjusted to achieve the desired result. In one embodiment, the desired result is, for each printed/cursive character pair in the training set, as set forth in Table 1:

TABLE 1

|  | output 430(0) | output 430(1) |
|---|---|---|
| printed character | 0 | 1 |
| cursive character | 1 | 0 |

In one embodiment, after training as described above, classifier 400 outputs values for the ink of FIGS. 7 and 8 as shown in FIG. 24.

In at least one embodiment, classifier 400 is trained using training data based on the ideal stroke count for a character, i.e. the number of strokes for the character written in clean print form. In particular, after collection of writing samples, a training sample is labeled as cursive if it is written in fewer strokes than the ideal stroke count for the character. The ideal stroke count is used because many individuals will not write in print or cursive when instructed to do so; another method is thus useful to classify a training sample as print or cursive. Another advantage of this approach is that data collected without asking a subject to write in any particular way is still usable. In certain embodiments, a training sample is not labeled as cursive unless it is written in fewer strokes than the ideal stroke count minus a "cursive buffer." In other words, a number (e.g., 1) is subtracted from the ideal stroke count, and a sample is not labeled cursive unless it has fewer strokes than the (ideal–buffer) difference.

Returning to FIG. 4, the output of classifier 400 is an indication of whether a particular ink character is cursive or print. If the character is classified as a print character, the character is processed using print character recognizer 500. In at least one embodiment, print character recognizer 500 operates as described in U.S. Pat. No. 6,094,506, previously incorporated by reference. As described in said patent, the strokes of the input ink are assigned feature codes. These feature codes correspond to reference features such as horizontal lines, vertical lines and curved lines.

The input character is then compared against every prototype in a database having the same number of strokes as the input character. Based on this comparison, a Shape Feature Probability Matrix (SFPM) is created in which each possible shape feature corresponds to a row and to a column. Each entry in the SFPM represents a probability that, for any two characters having s strokes and having shape features $f_i$ and $f_j$ at position p (where $f_i$ is the feature code for the input stroke, $f_j$ is the feature code for the prototype stroke and p=1, 2, . . . s), the characters are the same. A Position Feature Probability Table is also generated. The PFPT is a one-dimensional array containing one entry for each possible feature distance, and which is indexed by feature distance. The feature distance D is calculated as $(x^j_{p1} - x^i_{p1})^2 + (x^j_{p2} - x^i_{p2})^2 + (y^j_{p1} - y^i_{p1})^2 + (y^j_{p2} - y^i_{p2})^2$, where $(x^j_{p1}, y^j_{p1})$ and $(x^j_{p2}, y^j_{p2})$ are the start and end points for stroke p of the model, and where $(x^i_{p1}, y^i_{p1})$ and $(x^i_{p2}, y^i_{p2})$ are the start and end points for stroke p of the input ink. Each entry in the PFPT represents a probability that, for any two characters having s strokes and a feature distance D between strokes at the same position p, the characters are the same. During recognition, each input character is compared to each prototype by comparing the strokes of the input character and of the prototype; the first stroke of the input character is compared to the first stroke of the prototype, the second stroke of the input character is compared to the second stroke of the prototype, etc. Using the SFPM, a first number is computed by summing values obtained by indexing the first input and prototype strokes, by indexing the second input and prototype strokes, etc. Using the PFPT, a second number is computed by summing values indexed by the feature distances between the first input and first prototype strokes, between the second input and second prototype strokes, etc. A Match Probability value equals the sum of these first and second numbers. The prototype for which a comparison against the input character results in the highest probability of a match is considered the best match. As described in the '506 patent, the SFPM and PFPT values are based on a negative logarithmic function of the probability. Thus, the lowest Match Probability value corresponds to the highest probability of match.

Figure 25:
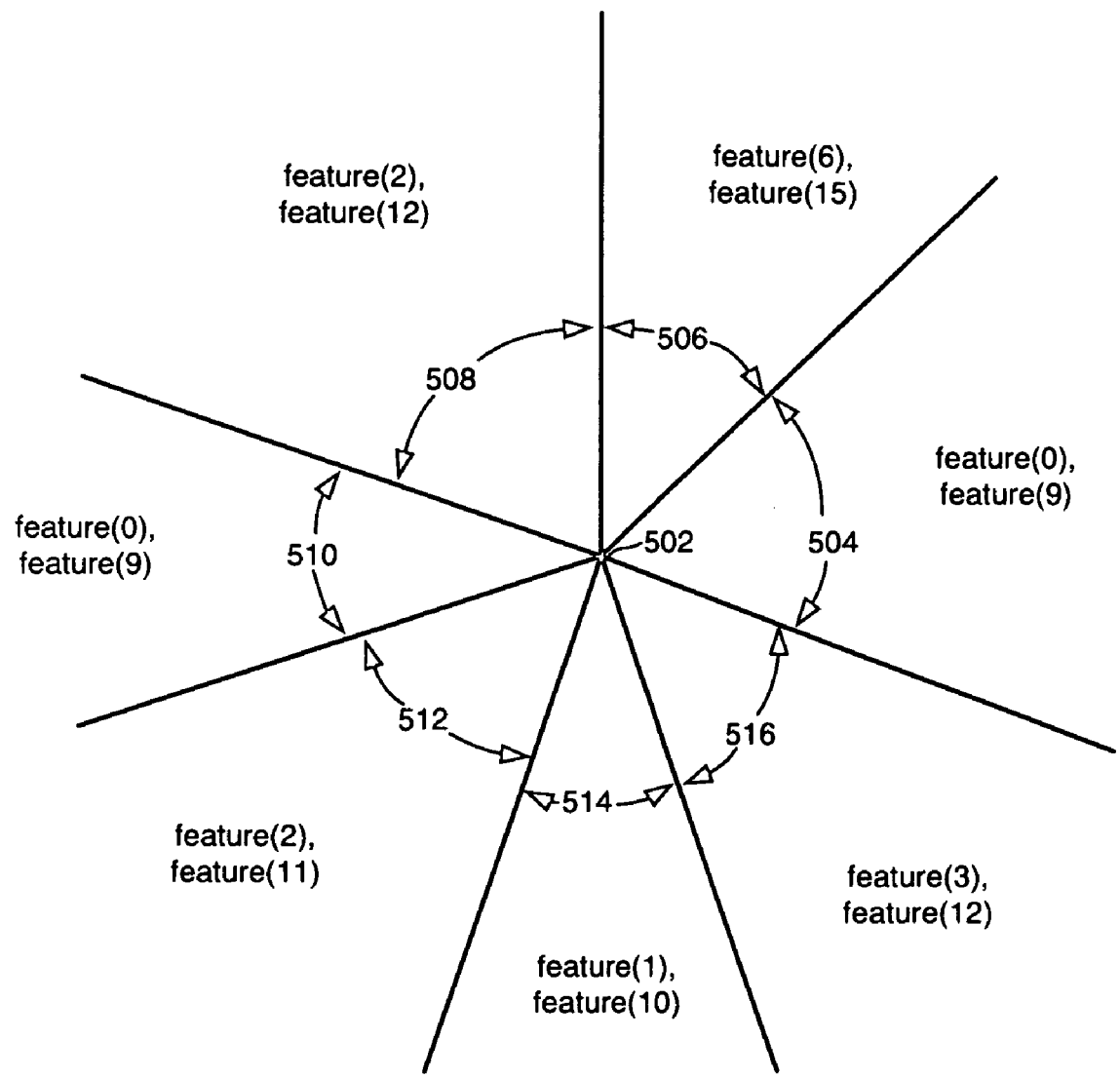
FIGS. 25 and 26 show feature types according to at least one embodiment of the invention.
Figure 26:
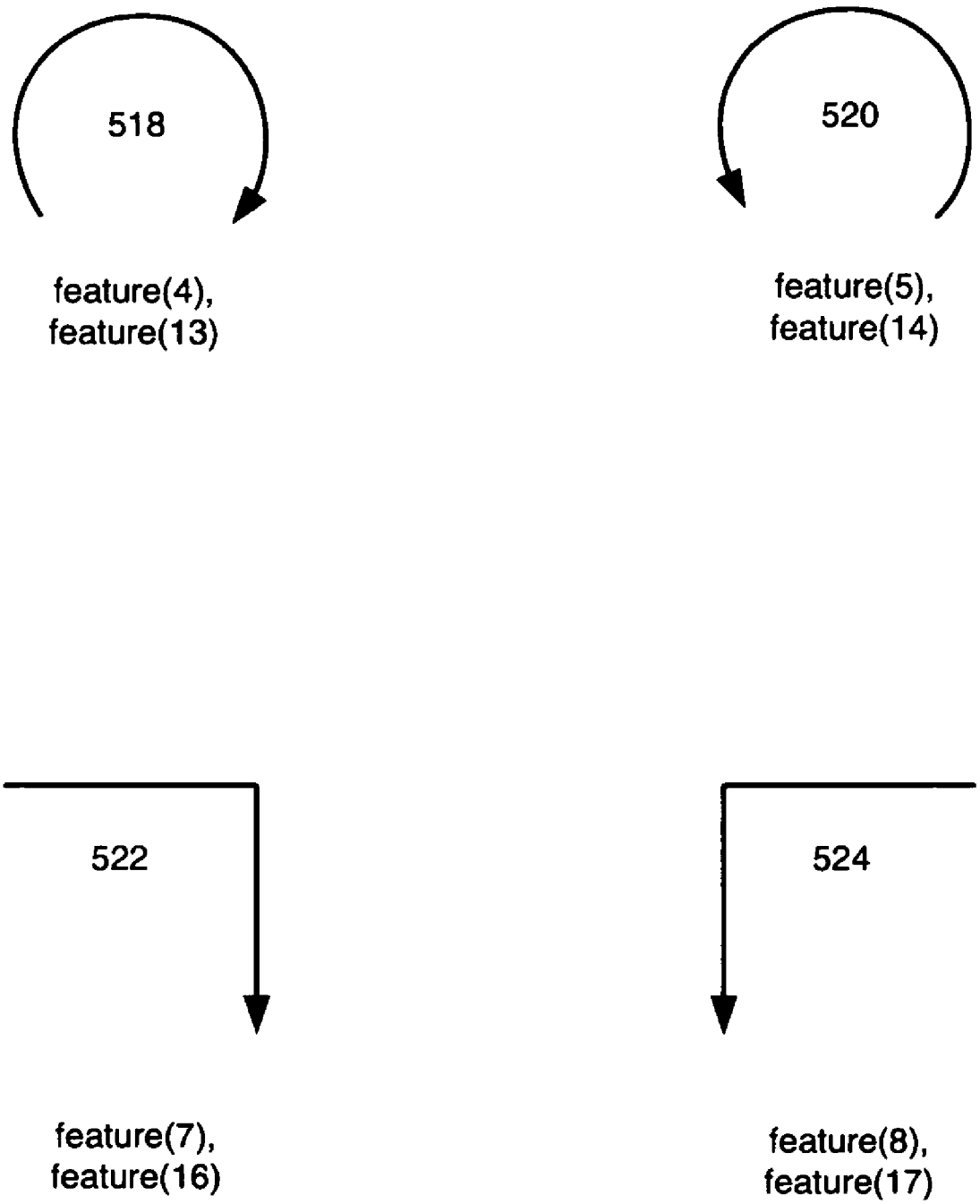

In some embodiments, there are eighteen possible features for a stroke. Stroke features depend on the shape and relative size of the stroke. A stroke is considered "small" if the width and height of the stroke are respectively less than 5/16 of the width and height of the character; otherwise the stroke is considered "large." Strokes that are straight (or substantially straight) lines are classified as one of ten possible feature codes, depending on the direction and length of the line. Shown in FIG. 25 are seven ranges of possible directions. Small lines having a direction beginning at origin 502 and extending outward into one of the regions labeled 504 or 510 are assigned a feature code 0, shown in FIG. 25 as feature(0). Large lines having the same direction are assigned a feature code 9, shown in FIG. 25 as feature(9). Other large and small straight lines have feature codes as shown in FIG. 25. FIG. 26 illustrates eight additional feature types. Small strokes having a clockwise curve are assigned a feature code 4, shown in FIG. 26 as feature(4). Large strokes having a clockwise curve are assigned a feature code 13, shown in FIG. 26 as feature(13). Other curved and angled strokes have feature codes as shown in FIG. 26.

Figure 27:
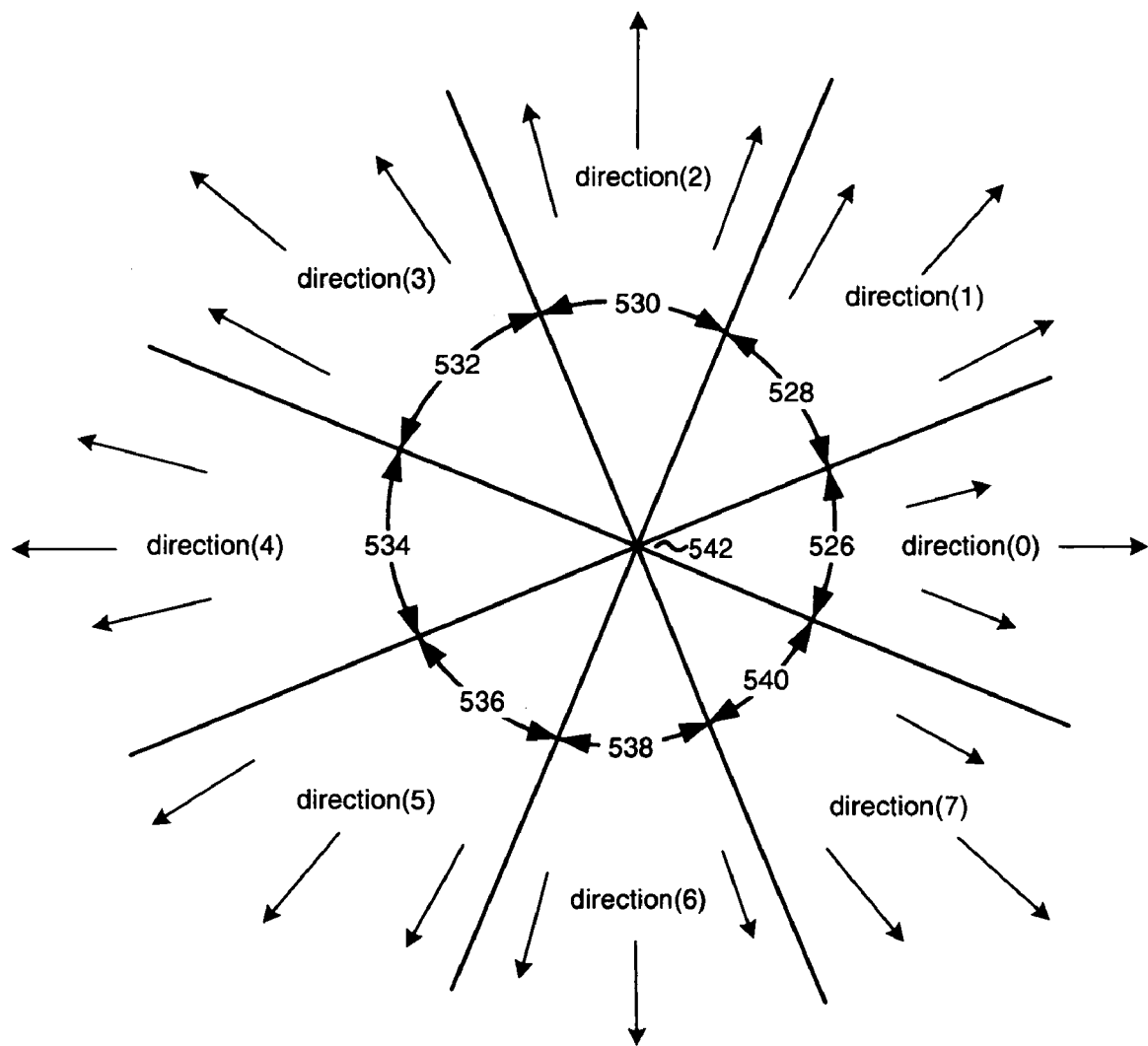
FIGS. 27 and 28 show determination of feature type according to at least one embodiment of the invention.

Strokes are considered as curved based on a change in direction of the stroke. Specifically, the direction of the stroke is monitored from beginning to end of the stroke. In this regard, the stroke is analyzed from the viewpoint of an imaginary person walking along the stroke as it is being drawn; a direction is assigned based on the angular sectors shown in FIG. 27. For example, a stroke beginning at the origin 542 of FIG. 27 and extending into the region 526 would have direction(0). If the direction of the stroke remains parallel to a vector beginning at origin 542 and terminating in region 526, the stroke has not changed direction. If the stroke at any time has a direction parallel to a vector beginning at origin 552 and ending in any of regions 528-540, the stroke has changed direction.

Figure 28:
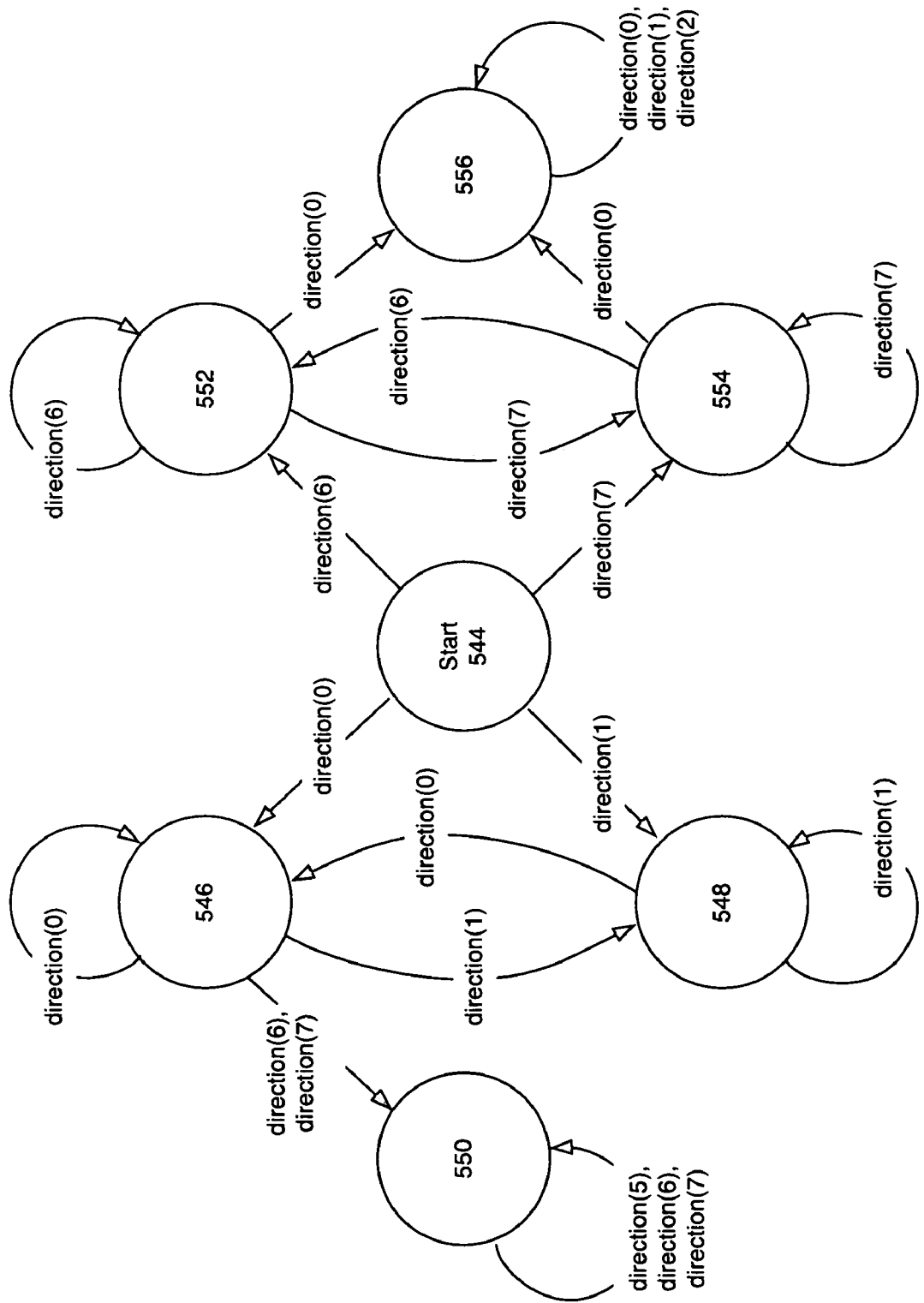

If a stroke is determined to be curved, it is initially considered to have a feature corresponding to shape 518 or shape 520 (FIG. 26). The state machine of FIG. 28 is then used to determine whether the stroke should instead be considered to have a feature corresponding to shape 522 or shape 524 (FIG. 26). The state machine begins at Start block 544 and transitions depending on the direction code for each step along the stroke. If the stroke has direction(0), the state machine transitions to block 546. If the stroke then maintains direction(0), the state machine remains at block 546. If the stroke changes to direction(1), the state machine transitions to block 548. If the stroke changes back to direction(0), the state machine returns to block 546. If the stroke changes to direction(6) or direction(7) while in block 546, the state machine transitions to block 550, where it remains so long as the stroke has direction(5), direction(6) or direction(7). If the stroke has direction(1) at its beginning (Start block 544), the state machine transitions to block 548. If the stroke has direction(6) or direction(7) at its beginning (Start block 544), the state machine transitions to block 552 or block 554. The state machine transitions to block 556 from block 552 or block 554 if the stroke has direction(0). If the state machine is in block 550 at the end of the stroke, then a feature code corresponding to shape 520 (FIG. 26) is changed to a feature code corresponding to shape 524. If the state machine is in block 556 at the end of the stroke, then a feature code corresponding to shape 518 is changed to a feature code corresponding to shape 522.

Figure 29:
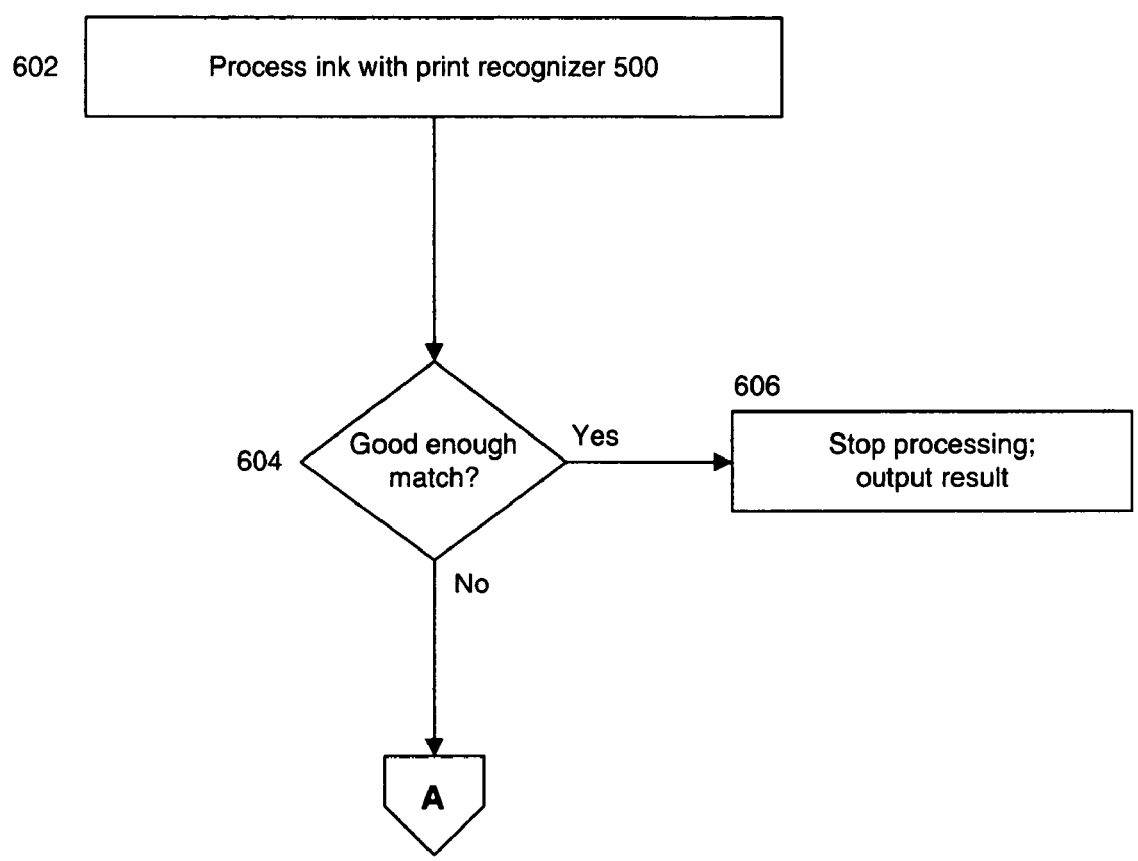
FIGS. 29-31 are flow charts showing operation of a cursive recognizer according to at least one embodiment of the invention.
Figure 30:
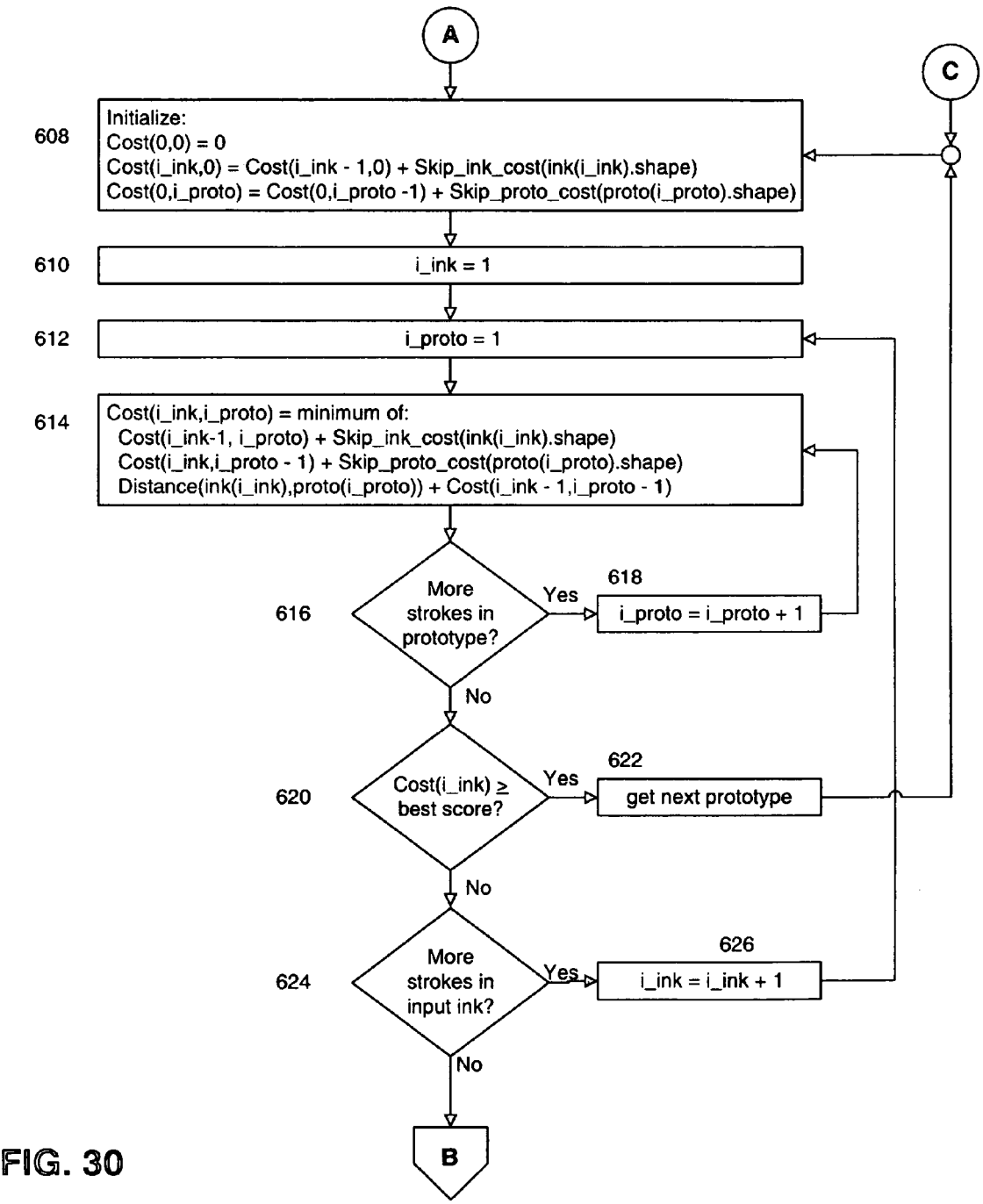
Figure 31:
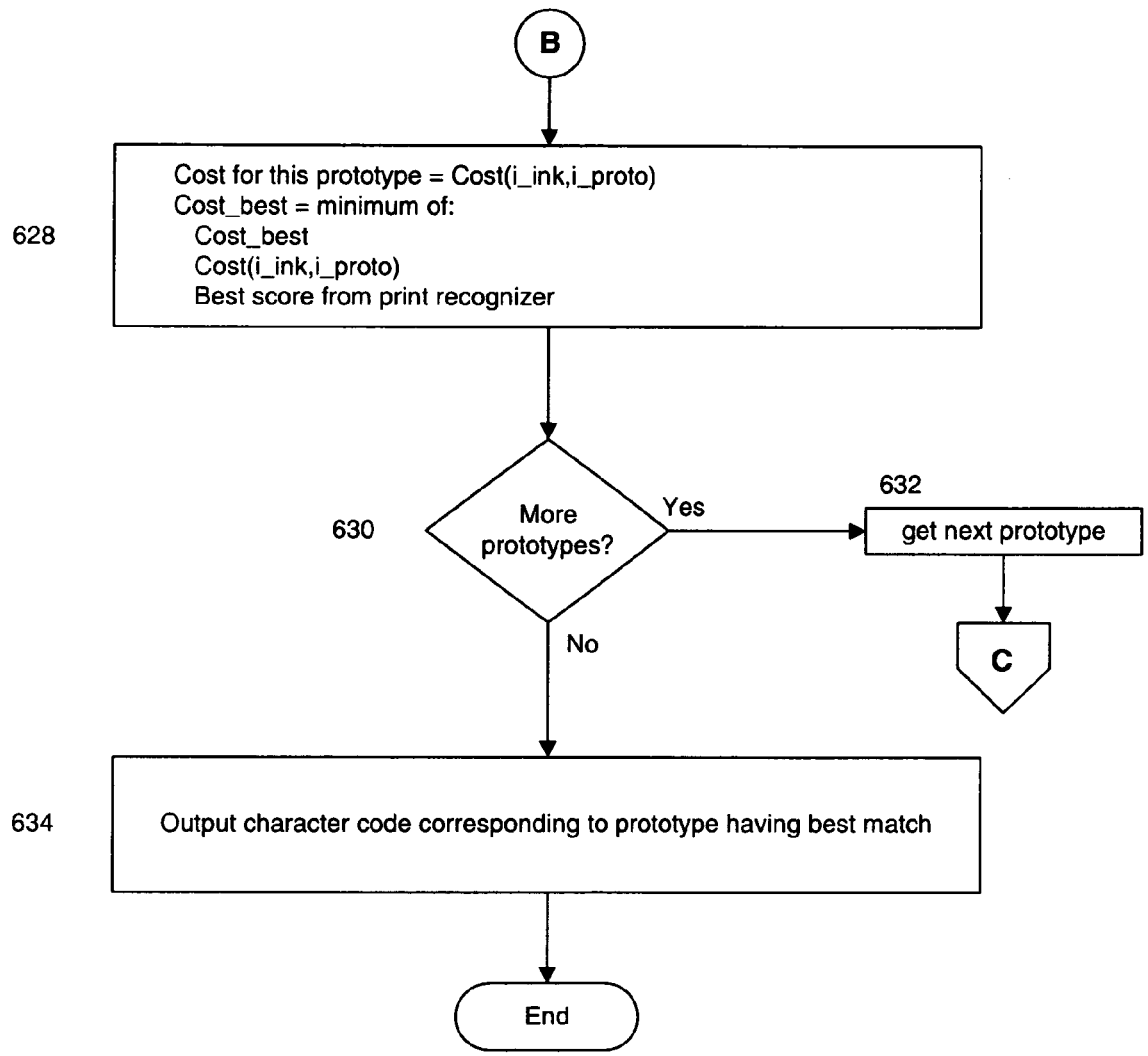

FIGS. 29 through 31 are flow charts showing operation of cursive recognizer 600 according to at least one embodiment of the invention. Beginning at block 602 (FIG. 29), the cursive character is first processed using print recognizer 500, the operation of which is described above and in the '506 patent. In at least one embodiment, this processing is performed only with regard to the space s corresponding to the number of strokes in the input cursive ink. If the quality of match is sufficiently good (block 604), processing stops, and the character code corresponding to the match is output (block 606). In at least one embodiment, the threshold applied at block 604 requires that a "good enough" match have a Match Probability value that is less than or equal to 1.75 times a minimum Match Probability value times the number of strokes in the ink. The minimum Match Probability value is determined using a SFPM and a PFPT as described by the '506 patent. The SFPM and PFPT may also be obtained in a fashion as described in the '506 patent. The feature code of an input ink stroke is used as an index to the SFPM, and the lowest value corresponding to the stroke's feature code is selected from the SFPM. The lowest value from the PFPT (which may not necessarily correspond to a 0 feature distance) is then added to the lowest value obtained from the SFPM. This is repeated for each input ink stroke, and the values summed to provide the minimum Match Probability value. If the match quality is not sufficiently good at block 604, the best match score (best Match Probability value) from print recognizer 500 is stored, and processing continues via off-page connector A.

In the remaining steps of FIGS. 30 and 31, cursive recognizer 600 compares the input ink to each prototype in the s+1 space using a technique known as "dynamic time warping" (DTW), also known as "dynamic programming" or (in some contexts) "elastic matching." As is known in the art, DTW compares a test figure (or other type of data) with a prototype, and determines a cost associated with inserting, deleting or substituting features of the test figure in order to yield the prototype. The test figure is then compared with additional prototypes, each comparison resulting in a cost value. The comparison with the lowest cost is considered the best match. Because cursive characters typically have fewer strokes than print characters, and because there are generally many more print characters than cursive characters in a prototype database, it is to be expected that recognitions will usually result from comparison with prototypes in a higher space than the input cursive ink. By limiting DTW matching to the s+1 space, processing time is reduced. Moreover, in at least one embodiment of the invention, complex strokes of an input ink character are first segmented into simpler strokes, giving the character a more print-like form. The segmentation may not coincide precisely with the print form of the character. However, the segmentation will often will often cause the character to occupy a space close to the print form, and only searching in the s+1 space thus gives a reasonable accuracy improvement. In at least one embodiment, a stroke segmentation module first finds the local extrema points on a stroke of input ink. The local extrema points are then stepped through, two or three at a time. The stroke segmentation module compares the ink segments that are adjacent to the local extrema points to a set of predefined stroke-segmentation patterns to find a closest matching stroke-segmentation pattern. Strokes are then segmented based on a stroke-segmentation rule that corresponds to the closest matching stroke-segmentation pattern.

Proceeding from connector A (FIG. 30) to block 608, cost values Cost(0,0), Cost(i_ink,0) and Cost(0,i_proto) are initialized for use in subsequent calculations. The quantity Skip_ink_cost(ink(i_ink).shape) is a cost associated with not comparing a particular stroke of the input ink with a prototype. The quantity Skip_ink_cost(ink(i_ink).shape) is calculated for each stroke of an input ink character using a SFPM and a PFPT created for the ink. For a particular input ink stroke n (i_ink=n), Skip_ink_cost(ink(i_ink).shape) is calculated by first adding the highest value in the SFPM row (or column) for the feature code of ink stroke n to the highest value in the PFPT for the input ink. Skip_ink_cost(ink(i_ink).shape) for ink stroke n is then set to one half of this sum. Skip_ink_cost(ink(i_ink).shape) is calculated for each stroke of the ink, and a table of Skip_ink_cost(ink(i_ink).shape) values (indexed by ink stroke) is created for the ink. Skip_proto_cost(proto(i_proto).shape) is a cost associated with not comparing a particular stroke of a prototype with an input ink character. Skip_proto_cost(proto(i_proto).shape) is computed, in a manner similar to that used to compute Skip_ink_cost(ink(Link).shape), for each stroke of a prototype character. For a particular prototype stroke n (i_proto=n), Skip_proto_cost(proto(i_proto).shape) is calculated by first adding the highest value in the SFPM column (or row) for the feature code of prototype stroke n to the highest value in the PFPT. Skip_proto_cost(proto(i_proto).shape) for prototype stroke n is then set to one eighth of this sum. Skip_proto_cost(proto(i_proto).shape) is calculated for each stroke of the prototype, and a table of Skip_proto_cost(proto(i_proto).shape) values (indexed by prototype stroke) is created for the prototype. In at least one embodiment, the SFPM and PFPT, as well as tables providing Skip_ink_cost(ink(i_ink).shape) and Skip_proto cost(proto(i_proto).shape) values, are computed in advance (before further recognition is performed) using methods similar to those described in the '506 patent.

At block 610, the variable i_ink (representing an index to strokes of an input ink character being processed) is set to 1. At block 612, the variable i_proto (representing an index to strokes of a prototype character being processed) is also set to 1. At block 614, Cost(i_ink,i_proto) is calculated. Cost(i_ink,i_proto) represents the cost, for the input ink stroke currently being processed, of insertion, deletion or substitution to obtain the prototype stroke currently being considered. As shown in FIG. 30, Cost(i_ink,i_proto) is the minimum of three values. The first, "Cost(i_ink−1,i_proto) + Skip_ink_cost(ink(i_ink).shape)," represents a cost associated with deleting the input ink stroke currently under consideration. The second, "Cost(i_ink,i_proto−1)+Skip_proto_cost(proto(i_proto).shape)," represents a cost associated with a cost of deleting the prototype ink stroke currently under consideration (analogous to inserting a stroke in the input ink). The third, "Distance(ink(i_ink),proto(i_proto))+Cost(i_ink−1,i_proto−1)" corresponds to the cost of substituting the prototype stroke under consideration with the input ink stroke under consideration. The cost of substituting a stroke for another very similar to it is low, while the cost of substituting a stroke with one very different from it is high. In at least one embodiment, Distance(ink(i_ink),proto(i_proto)) is calculated as a Match Probability value using a SFPM and a PFPT, as described in the '506 patent and as previously described with regard to print recognizer 500. Specifically, the feature codes for the prototype and ink strokes under consideration (i.e., i_ink and i_proto) are used as SFPM inputs, and the feature distance between the i_ink and i_proto strokes used as an index to the PFPT. At block 616, it is determined whether there are more strokes in the prototype. If yes, i_proto is incremented at block 618, and processing returns to block 614. If no, processing proceeds to block 620. At block 620, cursive recognizer 600 determines whether Cost(i_ink) is greater than or equal to the best cost value obtained at the conclusion of previous comparisons of the input ink character to other prototypes. Cost(i_ink) is the minimum, based on the current value of i_ink over all i_proto values (i.e., all strokes) processed so far for the current prototype, of Cost(ink(i_ink),proto(i_proto)). If the answer at block 620 is yes, no further comparisons between the input ink character and the current prototype are made, as the current prototype cannot be the best match. A new prototype is retrieved at block 622, and processing returns to block 608, where comparisons between the input ink character and the newly-retrieved prototype begin.

If it is determined at block 620 that Cost(i_ink) does not exceed the best cost value from earlier comparisons, processing continues to block 624. If there are more strokes in the input ink to be compared to the current prototype, i_ink is incremented at block 626, and processing returns to block 612. In this manner, each stroke of the input ink is compared to each stroke of the prototype. If it is determined at block 624 that there are no more strokes in the input ink, processing continues (via off-page connector B) to block 628 (FIG. 31). At block 628, the final value for cost resulting from comparison of the input ink stroke to the current prototype (Cost(i_ink,i_proto)) is compared to Cost_best (the best score obtained from comparison of the ink to other prototypes) and to the score from processing of the ink by print recognizer 500. Cost_best is set (or reset) to the minimum of these 3 values.

At block 630, it is determined whether there are more prototypes in the current s+1 space against which the input ink has not been compared. If yes, the next prototype is retrieved at block 632, and processing returns (via off-page connector C) to block 608 (FIG. 30). If no, processing continues to block 634, where the character code corresponding to the current Cost_best is output.

In other embodiments, cursive recognizer 600 maintains a list of a certain number (e.g., 20) of prior comparisons of the ink to other prototypes having the best score. In such embodiments, the "early out" heuristic of block 620 is modified to compare the cost for the current ink stroke with the worst score on the list of best scores. At block 634, additional steps are then performed to choose a best match from the 20 matches having the lowest cost. As one example, the list of the best 20 prior comparisons could be initialized with the 20 best matches obtained during processing of the input cursive ink by print recognizer 500. At block 634, the character corresponding to the best match in this list is output as a recognition result. Some or all of the initial 20 best matches may be replaced during iterations of the steps in FIGS. 30 and 31. However, if the best match is from processing by print recognizer 500, that match would be used for determining the recognition result.

In still other embodiments, the comparison steps of blocks 608 through 632 are not limited to prototypes in the s+1 space. In those other embodiments, the comparison is also made against prototypes in the s and/or s−1 spaces, and/or in other spaces. Similarly, a cursive character may also be processed by print recognizer 500 (block 602 of FIG. 29) in the s−1 and/or s+1 spaces, and/or in other spaces. In still other embodiments, the number of prototypes against which an ink sample is compared can be further limited in certain circumstances, e.g., when it is known that the user is providing numerals or otherwise limited to a more restricted character set.

Although specific examples of carrying out the invention have been described, those skilled in the art will appreciate that there are numerous variations and permutations of the above described systems and techniques that fall within the spirit and scope of the invention as set forth in the appended claims. As but one example, the invention could also be applied to Optical Character Recognition (OCR) of print and cursive handwriting created in a conventional manner with pen and paper. As another example, a machine-readable medium could have machine-executable instructions stored thereon such that, when the instructions are read and executed by an appropriate device (or devices), steps of a method according to the invention are performed. These and other modifications are within the scope of the invention as defined by the attached claims.

The invention claimed is:

1. A method of associating input handwritten characters with specific characters from a group of known characters, comprising:
    classifying input handwritten characters as print or cursive;
    analyzing print-classified handwritten characters using a first set of character recognition steps; and
    analyzing cursive-classified handwritten characters using a second set of character recognition steps with indexing features for shape characteristics and positional distance, the second set of character recognition steps including at least one recognition algorithm not implemented in the first set,
    wherein each of the handwritten input characters comprises a plurality of strokes, and wherein:
    input characters having s strokes are only compared with prototype characters having s strokes during the first set of character recognition steps, and
    input characters having s strokes are only compared with prototype characters having more than s strokes during the second set of character recognition steps.

2. The method of claim 1, wherein the at least one algorithm not implemented in the first set of recognition steps comprises a Dynamic Time Warping (DTW) algorithm.

3. The method of claim 2, wherein each of the input handwritten characters comprises a plurality of strokes, and wherein the DTW algorithm comprises:
    comparing a first input character with multiple prototypes, each prototype having a corresponding known character,
    computing, for each comparison of the first input character with one of the multiple prototypes, a cost of inserting, deleting or substituting one or more strokes of the first input character to obtain the prototype, and
    associating the first input character with the known character corresponding to a matched prototype based on the cost of comparison with the matched prototype.

4. The method of claim 3, wherein the DTW algorithm further comprises:
    determining, prior to completion of a comparison of a second input character with a current prototype, a non-match between the second input character and the current prototype, and
    ceasing comparison with the current prototype upon determining the non-match.

5. The method of claim 1, wherein the second set of character recognition steps comprises:
    (a) analyzing a first cursive-classified handwritten character using the first set of character recognition steps,
    (b) determining, based on the analysis of step (a), that a quality of match between the first cursive-classified character and a prototype exceeds a recognition threshold,
    (c) outputting a recognition result for the first cursive-classified character without further recognition processing,
    (d) analyzing a second cursive-classified handwritten character using the first set of character recognition steps,
    (e) determining, based on the analysis of step (d), that a quality of match between the first cursive-classified character and a prototype does not exceed a recognition threshold, and
    (f) applying the at least one recognition algorithm not implemented in the first set to the second cursive-classified character.

6. The method of claim 1, wherein classifying input handwritten characters as print or cursive comprises:
    computing numerical feature values based on the shape of an input character,
    applying each feature value to an input of an artificial neural network, and
    obtaining output values from the neural network indicative of a probability of the input character being print or cursive.

7. The method of claim 6, wherein:
    first, second and third pluralities of feature values are respectively derived from first, second and third contours based on the input character,
    fourth, fifth and sixth pluralities of feature values are respectively derived from x, y and z coordinates of points based on the input character, and
    a seventh plurality of feature values is derived from angles formed by segments joining points based on the input character.

8. The method of claim 6, wherein the second set of character recognition steps comprises:
    (a) analyzing a first cursive-classified handwritten character using the first set of character recognition steps,
    (b) determining, based on the analysis of step (a), that a quality of match between the first cursive-classified character and a prototype exceeds a recognition threshold,
    (c) outputting a recognition result for the first cursive-classified character without further recognition processing,
    (d) analyzing a second cursive-classified handwritten character using the first set of character recognition steps,
    (e) determining, based on the analysis of step (d), that a quality of match between the first cursive-classified character and a prototype does not exceed a recognition threshold, and
    (f) applying the at least one recognition algorithm not implemented in the first set to the second cursive-classified character.

9. The method of claim 6, wherein the at least one algorithm not implemented in the first set of recognition steps comprises a Dynamic Time Warping (DTW) algorithm.

10. A computer-readable medium having stored thereon data representing sequences of instructions which, when executed by a processor, cause the processor to perform steps comprising:
    classifying input handwritten characters as print or cursive;
    analyzing print-classified handwritten characters using a first set of character recognition steps; and
    analyzing cursive-classified handwritten characters using a second set of character recognition steps with indexing features for shape characteristics and positional distance, the second set of character recognition steps including at least one recognition algorithm not implemented in the first set,
    wherein each of the handwritten input characters comprises a plurality of strokes, and wherein:
    input characters having s strokes are only compared with prototype characters having s strokes during the first set of character recognition steps, and input characters having s strokes are only compared with prototype characters having more than s strokes during the second set of character recognition steps.

11. The computer-readable medium of claim 10, wherein the at least one algorithm not implemented in the first set of recognition steps comprises a Dynamic Time Warping (DTW) algorithm.

12. The computer-readable medium of claim 11, wherein each of the input handwritten characters comprises a plurality of strokes, and wherein the DTW algorithm comprises:
comparing a first input character with multiple prototypes, each prototype having a corresponding known character,
computing, for each comparison of the first input character with one of the multiple prototypes, a cost of inserting, deleting or substituting one or more strokes of the first input character to obtain the prototype, and
associating the first input character with the known character corresponding to a matched prototype based on the cost of comparison with the matched prototype.

13. The computer-readable medium of claim 12, wherein the DTW algorithm further comprises:
determining, prior to completion of a comparison of a second input character with a current prototype, a non-match between the second input character and the current prototype, and
ceasing comparison with the current prototype upon determining the non-match.

14. The computer-readable medium of claim 12, wherein the DTW algorithm further comprises:
determining, prior to completion of a comparison of a second input character with a current prototype, whether the cost of inserting, deleting or substituting one or more strokes exceeds a cost previously-computed during comparison of the second input character with another prototype, and
ceasing, upon determining that the cost exceeds the previously-computed cost, comparison with the current prototype.

15. The computer-readable medium of claim 10, wherein the second set of character recognition steps comprises:
(a) analyzing a first cursive-classified handwritten character using the first set of character recognition steps,
(b) determining, based on the analysis of step (a), that a quality of match between the first cursive-classified character and a prototype exceeds a recognition threshold,
(c) outputting a recognition result for the first cursive-classified character without further recognition processing,
(d) analyzing a second cursive-classified handwritten character using the first set of character recognition steps,
(e) determining, based on the analysis of step (d), that a quality of match between the first cursive-classified character and a prototype does not exceed a recognition threshold, and
(f) applying the at least one recognition algorithm not implemented in the first set to the second cursive-classified character.

16. The computer-readable medium of claim 15, wherein the at least one recognition algorithm comprises:
(g) comparing the second cursive-classified handwritten character with multiple prototype characters,
(h) computing, for each comparison, a cost of inserting, deleting or substituting one or more strokes of the second cursive-classified handwritten character to obtain a prototype character against which the input character is being compared, and
(i) associating the second cursive-classified handwritten character with a known character at the conclusion of step (h).

17. The computer-readable medium of claim 16, wherein step (e) includes comparing the second cursive-classified character with each of a plurality of prototype characters and determining a quality of match for each comparison, step (h) includes determining a quality of match between the second cursive-classified character and each of the multiple prototype characters, and wherein the second set of character recognition steps further comprises:
(j) determining that no comparison in step (h) yielded a quality of match exceeding a best quality of match found in step (e), and
(k) associating the second cursive-classified handwritten character with a known character corresponding to the prototype resulting in the best match in step (e).

18. The computer-readable medium of claim 10, wherein classifying input handwritten characters as print or cursive comprises:
computing numerical feature values based on the shape of an input character,
applying each feature value to an input of an artificial neural network, and
obtaining output values from the neural network indicative of a probability of the input character being print or cursive.

19. The computer-readable medium of claim 18, wherein:
first, second and third pluralities of feature values are respectively derived from first, second and third contours based on the input character,
fourth, fifth and sixth pluralities of feature values are respectively derived from x, y and z coordinates of points based on the input character, and
a seventh plurality of feature values is derived from angles formed by segments joining points based on the input character.

20. The computer-readable medium of claim 18, wherein the second set of character recognition steps comprises:
(a) analyzing a first cursive-classified handwritten character using the first set of character recognition steps,
(b) determining, based on the analysis of step (a), that a quality of match between the first cursive-classified character and a prototype exceeds a recognition threshold,
(c) outputting a recognition result for the first cursive-classified character without further recognition processing,
(d) analyzing a second cursive-classified handwritten character using the first set of character recognition steps,
(e) determining, based on the analysis of step (d), that a quality of match between the first cursive-classified character and a prototype does not exceed a recognition threshold, and
(f) applying the at least one recognition algorithm not implemented in the first set to the second cursive-classified character.

21. The computer-readable medium of claim 20, wherein the at least one recognition algorithm comprises:
(g) comparing the second cursive-classified handwritten character with multiple prototype characters,
(h) computing, for each comparison, a cost of inserting, deleting or substituting one or more strokes of the second cursive-classified handwritten character to obtain a prototype character against which the input character is being compared, and (i) associating the second cursive-classified handwritten character with a known character at the conclusion of step (h).

22. The computer-readable medium of claim 18, wherein the at least one algorithm not implemented in the first set of recognition steps comprises a Dynamic Time Warping (DTW) algorithm.

23. A system for associating input handwritten characters with specific characters from a group of known characters, comprising:

an input receiving data pertaining to input handwritten characters;

a memory; and a processor configured to perform steps comprising:

classifying input handwritten characters as print or cursive, analyzing print-classified handwritten characters using a first set of character recognition steps, and analyzing cursive-classified handwritten characters using a second set of character recognition steps with indexing features for shape characteristics and positional distance, the second set of character recognition steps including at least one recognition algorithm not implemented in the first sets, wherein each of the handwritten input characters comprises a plurality of strokes, and wherein:

input characters having s strokes are only compared with prototype characters having s strokes during the first set of character recognition steps, and input characters having s strokes are only compared with prototype characters having more than s strokes during the second set of character recognition steps.

24. The system of claim 23, wherein the at least one algorithm not implemented in the first set of recognition steps comprises a Dynamic Time Warping (DTW) algorithm.

25. The system of claim 23, wherein classifying input handwritten characters as print or cursive comprises:

computing numerical feature values based on the shape of an input character, applying each feature value to an input of an artificial neural network, and obtaining output values from the neural network indicative of a probability of the input character being print or cursive.

26. The system of claim 25, wherein:

first, second and third pluralities of feature values are respectively derived from first, second and third contours based on the input character, fourth, fifth and sixth pluralities of feature values are respectively derived from x, y and z coordinates of points based on the input character, and a seventh plurality of feature values is derived from angles formed by segments joining points based on the input character.

27. The system of claim 25, wherein the at least one algorithm not implemented in the first set of recognition steps comprises a Dynamic Time Warping (DTW) algorithm.

* * * * *

UNITED STATES PATENT AND TRADEMARK OFFICE
CERTIFICATE OF CORRECTION

| | | |
|---|---|---|
| PATENT NO. | : 7,369,702 B2 | Page 1 of 1 |
| APPLICATION NO. | : 10/702663 | |
| DATED | : May 6, 2008 | |
| INVENTOR(S) | : Ahmad A. Abdulkader et al. | |

It is certified that error appears in the above-identified patent and that said Letters Patent is hereby corrected as shown below:

In column 19, line 25, in Claim 23, delete "sets," and insert -- set, --, therefor.

Signed and Sealed this
Twelfth Day of April, 2011

David J. Kappos
*Director of the United States Patent and Trademark Office*